(12) United States Patent
Moriya

(10) Patent No.: US 9,661,290 B2
(45) Date of Patent: May 23, 2017

(54) IMAGE PROCESSING APPARATUS AND METHOD

(71) Applicant: SAMSUNG ELECTRONICS CO., LTD., Suwon-si (KR)

(72) Inventor: Tsuyoshi Moriya, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/948,922

(22) Filed: Nov. 23, 2015

(65) Prior Publication Data

US 2016/0155217 A1 Jun. 2, 2016

(30) Foreign Application Priority Data

Nov. 21, 2014 (JP) .................................. 2014-236433
Aug. 6, 2015 (JP) .................................. 2015-155685
Nov. 3, 2015 (KR) ......................... 10-2015-0153810

(51) Int. Cl.
| | | |
|---|---|---|
| G06K 9/00 | (2006.01) | |
| H04N 9/73 | (2006.01) | |
| G06T 5/00 | (2006.01) | |
| H04N 5/235 | (2006.01) | |
| H04N 5/361 | (2011.01) | |
| H04N 5/365 | (2011.01) | |
| H04N 5/357 | (2011.01) | |

(52) U.S. Cl.
CPC ............. *H04N 9/735* (2013.01); *G06T 5/008* (2013.01); *H04N 5/235* (2013.01); *H04N 5/3572* (2013.01); *H04N 5/361* (2013.01); *H04N 5/3658* (2013.01)

(58) Field of Classification Search
CPC ....... G06T 5/008; G06T 7/0087; G06T 7/408; H04N 5/235; H04N 5/3572; H04N 5/361; H04N 5/3658
USPC .......................................... 382/167, 173, 274
See application file for complete search history.

(56) References Cited

U.S. PATENT DOCUMENTS

| | | | | |
|---|---|---|---|---|
| 8,300,051 | B2 * | 10/2012 | Kim ......................... | G06T 5/008 345/428 |
| 9,131,196 | B2 * | 9/2015 | Lim ......................... | H04N 9/64 |
| 9,270,959 | B2 * | 2/2016 | Shu ......................... | H04N 9/735 |
| 2001/0033701 | A1 | 10/2001 | Okisu et al. | |
| 2011/0091101 | A1 * | 4/2011 | Cote ......................... | G06T 5/008 382/167 |

FOREIGN PATENT DOCUMENTS

| | | |
|---|---|---|
| JP | 11-122525 A | 4/1999 |
| JP | 2006-080752 A | 3/2006 |
| JP | 2006-253970 A | 9/2006 |
| JP | 2008-177794 A | 7/2008 |

(Continued)

*Primary Examiner* — Kanjibhai Patel
(74) *Attorney, Agent, or Firm* — Sughrue Mion, PLLC

(57) ABSTRACT

An image processing method includes: receiving a captured image, determining block statistics which indicates image characteristics of each of a plurality of blocks by using the plurality of blocks obtained by dividing the captured image determining a shading estimation coefficient to be applied to the captured image by using the determined block statistics and an amount of infrared light included in a light source, and correcting shading of the captured image by using the determined shading estimation coefficient.

20 Claims, 34 Drawing Sheets

(56) References Cited

FOREIGN PATENT DOCUMENTS

| JP | 2010-178025 A | 8/2010 |
|----|---------------|--------|
| JP | 2013-198041 A | 9/2013 |
| JP | 2014-236433 A | 12/2014 |
| JP | 2015-095811 A | 5/2015 |
| JP | 2015-099962 A | 5/2015 |

* cited by examiner

FIG. 10

| | | | | | | | | | | | | | | | 400 |
|---|---|---|---|---|---|---|---|---|---|---|---|---|---|---|---|
| 5 | 5 | 5 | 4 | 4 | 4 | 3 | 3 | 3 | 3 | 4 | 4 | 4 | 5 | 5 | 5 |
| 5 | 5 | 4 | 4 | 3 | 3 | 3 | 3 | 3 | 3 | 3 | 3 | 4 | 4 | 5 | 5 |
| 5 | 4 | 4 | 3 | 3 | 3 | 2 | 2 | 2 | 2 | 3 | 3 | 3 | 4 | 4 | 5 |
| 5 | 4 | 4 | 3 | 3 | 2 | 2 | 2 | 2 | 2 | 2 | 3 | 3 | 4 | 4 | 5 |
| 4 | 4 | 3 | 3 | 2 | 2 | 1 | 1 | 1 | 1 | 2 | 2 | 3 | 3 | 4 | 4 |
| 4 | 4 | 3 | 3 | 2 | 2 | 1 | 0 | 0 | 1 | 2 | 2 | 3 | 3 | 4 | 4 |
| 4 | 4 | 3 | 3 | 2 | 2 | 1 | 0 | 0 | 1 | 2 | 2 | 3 | 3 | 4 | 4 |
| 4 | 4 | 3 | 3 | 2 | 2 | 1 | 1 | 1 | 1 | 2 | 2 | 3 | 3 | 4 | 4 |
| 5 | 4 | 4 | 3 | 3 | 2 | 2 | 2 | 2 | 2 | 2 | 3 | 3 | 4 | 4 | 5 |
| 5 | 4 | 4 | 3 | 3 | 3 | 2 | 2 | 2 | 2 | 3 | 3 | 3 | 4 | 4 | 5 |
| 5 | 5 | 4 | 4 | 3 | 3 | 3 | 3 | 3 | 3 | 3 | 3 | 4 | 4 | 5 | 5 |
| 5 | 5 | 5 | 4 | 4 | 4 | 3 | 3 | 3 | 3 | 4 | 4 | 4 | 5 | 5 | 5 |

A

| RANGE OF BLOCK COLOR EVALUATION VALUE | 0.65 | 0.7 | 0.75 | 0.8 | 0.85 | 0.9 | 0.95 | 1 | 1.05 | 1.1 | 1.15 | 1.2 | 1.25 | 1.3 | 1.35 | < |
|---|---|---|---|---|---|---|---|---|---|---|---|---|---|---|---|---|
| NUMBER OF INCLUDED BLOCKS | 0 | 0 | 0 | 0 | 0 | 0 | 0 | 172 | 21 | 12 | 12 | 32 | 6 | 1 | 0 | 0 |

MODE

B

G LEVEL WEIGHT = 1

G LEVEL WEIGHT = 0

| D | 0 | 1 | 2 | 3 | 4 | 5 | 6 |
|---|---|---|---|---|---|---|---|
| Ed | 1 | 1 | 0 | 1 | 1 | 1 | 1 |

B

| D | 0 | 1 | 2 | 3 | 4 | 5 | 6 |
|---|---|---|---|---|---|---|---|
| Ed | 1 | 0 | 1 | 1 | 1 | 1 | 1 |

C

| D | 0 | 1 | 2 | 3 | 4 | 5 | 6 |
|---|---|---|---|---|---|---|---|
| Ed | 1 | 1 | 0 | 0 | 1 | 1 | 1 |

FIG. 30
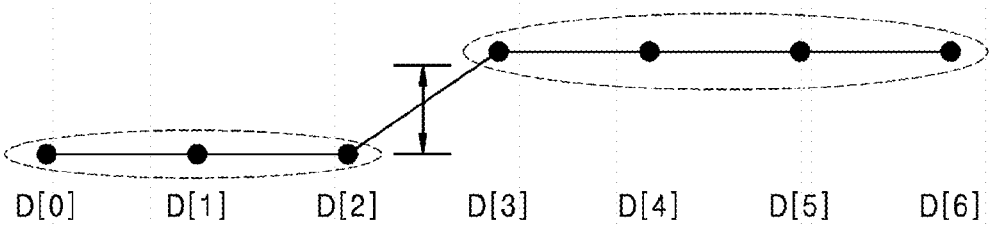
A
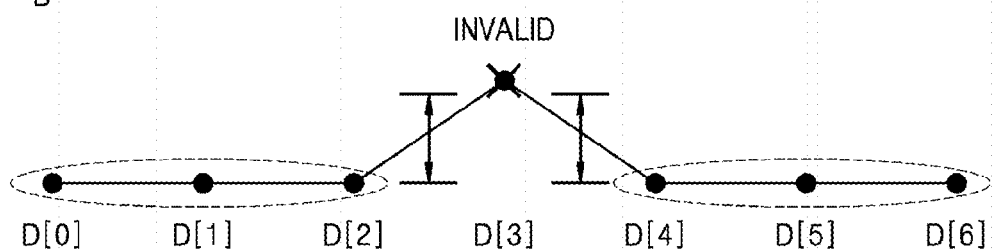
B

IMAGE PROCESSING APPARATUS AND METHOD

CROSS-REFERENCE TO RELATED APPLICATIONS

This application claims the benefit of Japanese Patent Application No. 2014-236433, filed on Nov. 21, 2014, in the Japanese Patent Office, Japanese Patent Application No. 2015-155685, filed on Aug. 6, 2015, in the Japanese Patent Office and Korean Patent Application No. 10-2015-0153810, filed on Nov. 3, 2015, in the Korean Intellectual Property Office, the disclosures of which are incorporated herein in their entireties by reference.

BACKGROUND

1. Field

The present disclosure relates to image processing apparatuses and methods, and more particularly, image processing apparatuses and methods that correct color shading of a captured image by using various shading estimations.

2. Description of the Related Art

An image processing apparatus divides a captured image into a plurality of blocks and corrects color shading of the captured image by using various statistical values of the blocks.

SUMMARY

Provided are image processing apparatuses and methods that correct color shading of a captured image by using various shading estimations.

Additional aspects will be set forth in part in the description which follows and, in part, will be apparent from the description, or may be learned by practice of the presented exemplary embodiments.

According to an aspect of an exemplary embodiment, an image processing apparatus includes: an input unit configured to receive a captured image; and a data processing unit configured to determine block statistics which indicates image characteristics of each of a plurality of blocks by using the plurality of blocks obtained by dividing the captured image, determine a shading estimation coefficient to be applied to the captured image by using the determined block statistics and an amount of infrared light included in a light source, and correct shading of the captured image by using the determined shading estimation coefficient.

The data processing unit may determine the shading estimation coefficient to be applied to the captured image by using at least one of luminance of the captured image, a color temperature of the light source, and flatness of the captured image.

The data processing unit may determine the flatness of the captured image by summing up differences of characteristic values of blocks continuous from a peripheral portion to a central portion of the captured image.

The data processing unit may determine a block color evaluation value by using the determined block statistics, determine a block weight by using the determined block color evaluation value, determine a block evaluation value by using the determined block statistics and the determined block weight, and determine the shading estimation coefficient to be applied to the captured image by using the determined block evaluation value.

The data processing unit may determine a histogram weight by using the determined block color evaluation value and determine the block weight by using the histogram weight and a G level weight.

The data processing unit may classify the plurality of blocks into a plurality of groups, determines the group evaluation value by using the determined block statistics and the classified groups, determine a valid group by using the determined block statistics and the determined group evaluation value, and determine the shading estimation coefficient to be applied to the captured image by using the determined valid group.

The data processing unit may determine the group evaluation value by averaging average values of the determined block evaluation values for each distance from a center of the captured image.

The data processing unit may estimate an approximate straight line by using the determined group evaluation value, determine the shading estimation coefficient to be applied to the captured image by using the estimated approximate straight line, estimate a sample variance by using the determined block evaluation value, and determine the shading estimation coefficient to be applied to the captured image by using the estimated sample variance.

When slopes of the estimated approximate straight line are negative, the data processing unit may determine the shading estimation coefficient that makes the estimated approximate straight line have a slope closest to zero among the negative slopes, and when the slopes of the estimated approximate straight line are nonzero, the data processing unit may determine the shading estimation coefficient that makes the estimated approximate straight line have a smallest slope among the nonzero slopes.

The data processing unit may estimate a variance by using the determined group evaluation value, determine the shading estimation coefficient to be applied to the captured image by using the estimated variance, estimate a sample variance by using the determined block evaluation value, and determine the shading estimation coefficient to be applied to the captured image by using the estimated sample variance.

According to an aspect of another exemplary embodiment, an image processing method includes: receiving a captured image; determining block statistics which indicates image characteristics of each of a plurality of blocks by using the plurality of blocks obtained by dividing the captured image; determining a shading estimation coefficient to be applied to the captured image by using the determined block statistics and an amount of infrared light included in a light source; and correcting shading of the captured image by using the determined shading estimation coefficient.

The determining of the shading estimation coefficient may include determining the shading estimation coefficient to be applied to the captured image by using at least one of luminance of the captured image, a color temperature of the light source, and flatness of the captured image.

The flatness of the captured image may be determined by summing up differences of characteristic values of blocks continuous from a peripheral portion to a central portion of the captured image.

The determining of the shading estimation coefficient may include: determining a block color evaluation value by using the determined block statistics; determining a block weight by using the determined block color evaluation value; determining a block evaluation value by using the determined block statistics and the determined block weight; and determining the shading estimation coefficient to be applied to the captured image by using the determined block evaluation value.

The determining of the block weight may include determining a histogram weight by using the determined block color evaluation value, and determining the block weight by using the histogram weight and a G level weight.

The determining of the shading estimation coefficient may include: classifying the plurality of blocks into a plurality of groups; determining the group evaluation value by using the determined block statistics and the classified groups; determining a valid group by using the determined block statistics and the determined group evaluation value; and determining the shading estimation coefficient to be applied to the captured image by using the determined valid group.

The determining of the group evaluation value may include determining the group evaluation value by averaging average values of the determined block evaluation values for each distance from a center of the captured image.

The determining of the shading estimation coefficient may include: estimating an approximate straight line by using the determined group evaluation value, and determining the shading estimation coefficient to be applied to the captured image by using the estimated approximate straight line; and estimating a sample variance by using the determined block evaluation value, and determining the shading estimation coefficient to be applied to the captured image by using the estimated sample variance.

The determining of the shading estimation coefficient may include: estimating a variance by using the determined group evaluation value, and determining the shading estimation coefficient to be applied to the captured image by using the estimated variance; and estimating a sample variance by using the determined block evaluation value, and determining the shading estimation coefficient by using the estimated sample variance.

According to an aspect of another exemplary embodiment, there is provided a non-transitory computer-readable recording media storing a program for executing the above-described method on a computer.

BRIEF DESCRIPTION OF THE DRAWINGS

These and/or other aspects will become apparent and more readily appreciated from the following description of the exemplary embodiments, taken in conjunction with the accompanying drawings in which:

FIG. 10 is a diagram illustrating an example of groups classified by a shading estimation coefficient determination unit, according to an exemplary embodiment;

FIG. 21 is a diagram illustrating an example of groups classified by a group classification unit, according to an exemplary embodiment;

FIG. 25 is a diagram for describing a method of operating a valid group determination unit, according to an exemplary embodiment;

FIG. 30 is a diagram for describing a method of determining a valid group, according to an exemplary embodiment.

DETAILED DESCRIPTION

Figure 1:
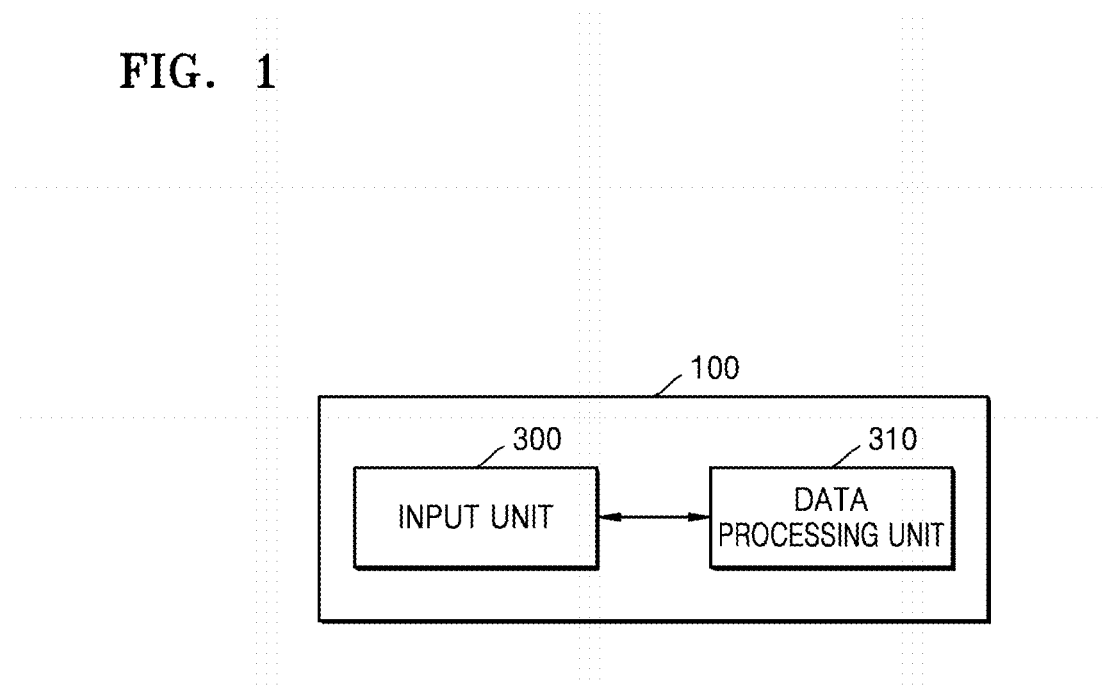
FIG. 1 is a block diagram of an image processing apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of" when preceding a list of elements, modify the entire list of elements and do not modify the individual elements of the list.

The terms used in this specification are general terms currently widely used in the art in consideration of functions in regard to the inventive concept, but the terms may vary according to the intention of those of ordinary skill in the art, precedents, or new technology in the art. In addition, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

The exemplary embodiments will be described with reference to the accompanying drawings in such a manner that the exemplary embodiments may be easily be carried out by a person of ordinary skill in the art. However, the inventive concept may be implemented in various forms and is not limited to the exemplary embodiments. In addition, descriptions of well-known functions and constructions will be omitted for clarity and conciseness, and similar reference numerals are assigned to similar components throughout the specification.

FIG. 1 is a block diagram of an image processing apparatus 100 according to an exemplary embodiment.

Referring to FIG. 1, the image processing apparatus 100 according to the present exemplary embodiment may include an input unit 300 and a data processing unit 310. The input unit 300 may receive a captured image, and the data processing unit 310 may determine block statistics which indicates image characteristics of each of a plurality of blocks by using the plurality of blocks obtained by dividing the captured image, determine a shading estimation coefficient to be applied to the captured image by using the determined block statistics and an amount of infrared light included in a light source, and correct shading of the captured image by using the determined shading estimation coefficient.

According to an exemplary embodiment, the data processing unit 310 may determine flatness of the captured image and determine the shading estimation coefficient to be applied to the captured image by using at least one of luminance of the captured image, a color temperature of the light source, and the determined flatness.

According to another exemplary embodiment, the data processing unit 310 may determine a block color evaluation value by using the determined block statistics, determine a block weight by using the determined block color evaluation value, determine a block evaluation value by using the determined block statistics and the determined block weight, and determine a shading estimation coefficient to be applied to the captured image by using the determined block evaluation value.

According to another exemplary embodiment, the data processing unit 310 may classify the plurality of blocks into a plurality of groups, determine a group evaluation value by using the determined block statistics and the classified groups, determine a valid group by using the determined block statistics and the determined group evaluation value, and determine a shading estimation coefficient to be applied to the captured image by using the determined valid group.

According to another exemplary embodiment, the data processing unit 310 may estimate an approximate straight line by using the determined group evaluation value, determine the shading estimation coefficient to be applied to the captured image, estimate a sample variance by using the determined block evaluation value, and determine a shading estimation coefficient to be applied to the captured image by using the estimated sample variance.

According to another exemplary embodiment, the data processing unit 310 may estimate a variance by using the determined group evaluation value, determine a shading estimation coefficient to be applied to the captured image by using the estimated variance, estimate a sample variance by using the determined block evaluation value, and determine a shading estimation coefficient to be applied to the captured image by using the estimated sample variance.

Figure 2:
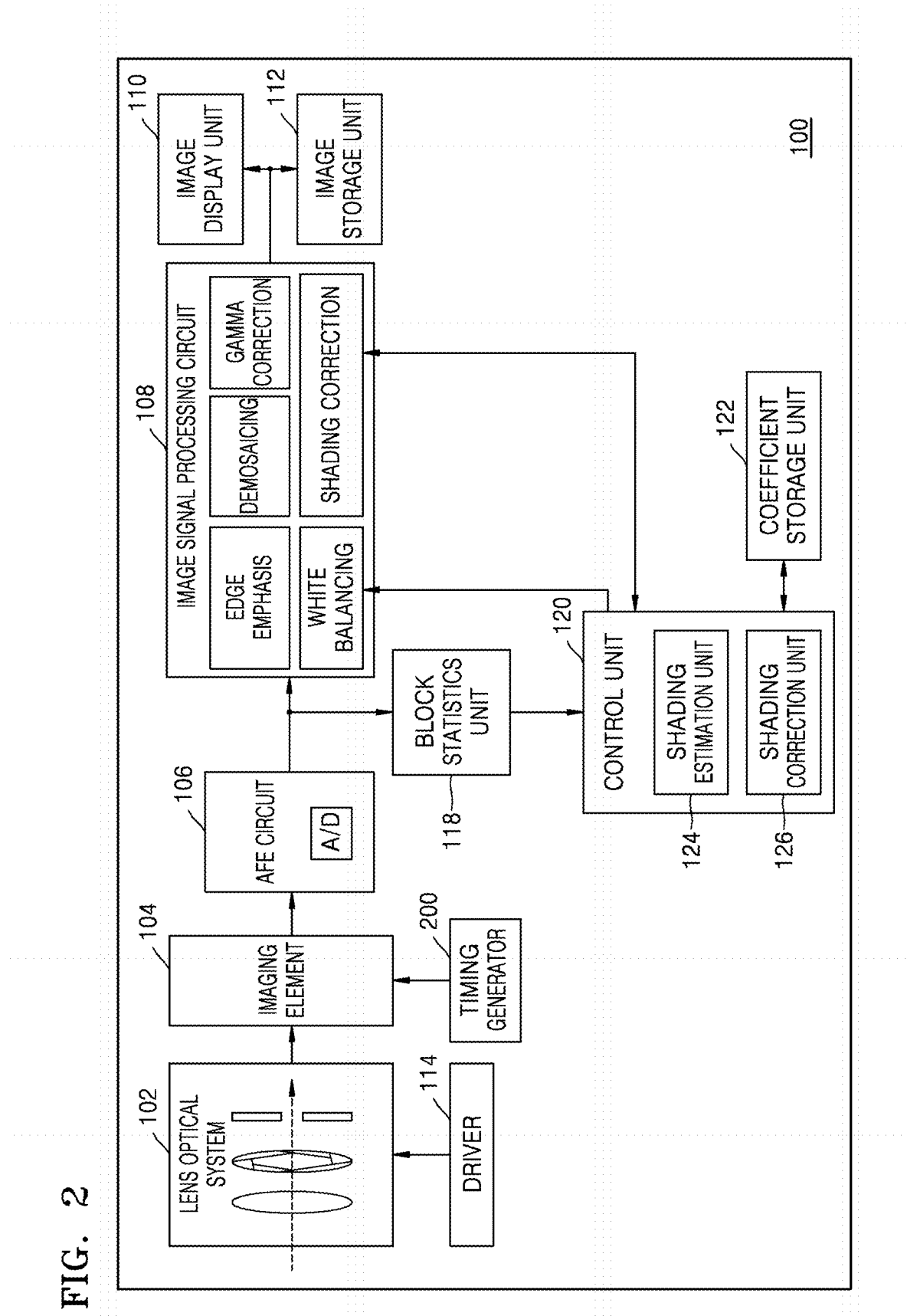
FIG. 2 is a block diagram of an image processing apparatus according to another exemplary embodiment.

FIG. 2 is a block diagram of an image processing apparatus 100 according to another exemplary embodiment.

Referring to FIG. 2, the image processing apparatus 100 according to the present exemplary embodiment may include a lens optical system 102, an imaging element 104, an analog front end (AFE) circuit 106, an image signal processing circuit 108, an image display unit 110, an image storage unit 112, a driver 114, a timing generator 116, a block statistics unit 118, a control unit 120, and a coefficient storage unit 122. The image processing apparatus 100 may be implemented by a digital camera or an external device such as a personal computer (PC), and the external device may perform shading estimation and shading correction on an image.

The lens optical system 102 according to the present exemplary embodiment may include a lens, an aperture, and a shutter and may form a subject image on an imaging surface of the imaging element 104. The imaging element 104 may be a charge-coupled device (CCD) image sensor or a complementary metal-oxide semiconductor (CMOS) image sensor, and an infrared cut filter (not illustrated) may be mounted on a side of the image element 104 that faces the lens optical system 102. The imaging element 104 may acquire an image signal (RGB color signal) by performing a photoelectric conversion on the subject image. The AFE circuit 106 may receive an image signal, which is acquired by the imaging element 104 and is signal-processed by a correlated double sampling (CDS)) circuit (not illustrated), and output a digital signal by performing an analog-to-digital (A/D) conversion on the received image signal.

The image signal processing circuit 108 may perform demosaicing processing, edge emphasis processing, white balancing (WB) processing, shading correction processing, and gamma correction processing on the image signal output by the AFE circuit 106. The image display unit 110 may be a liquid crystal display (LCD) and may display an image signal having experienced a variety of processing in the image signal processing circuit 108. The image storage unit 112 may be a memory and may store an image signal having experienced a variety of processing in the image signal processing circuit 108.

The driver 114 may drive the lens, the aperture, and the shutter of the lens optical system 102. The timing generator 116 may generate a timing for driving the imaging element 104. The block statistics unit 118 may divide all or part of a captured image, which is output as a digital signal by the AFE circuit 106, into a plurality of blocks and determines a block statistical value for each block. The block statistics unit 118 according to the present exemplary embodiment may include a block division unit and a statistical value determination unit. The block statistics unit 118 may determine, as the block statistics value, a value indicating image characteristics of each block, such as the sum of pixel values for each RGB or an average of pixel values for each RGB in each block. In addition to the statistical value, the block statistics unit 118 may also determine a value indicating image characteristics of each block. According to the present exemplary embodiment, the characteristic value of the block (R, G, and B values of the block) may be the sum or the average value of the R, G, and B values of the pixels in each block.

The control unit 120 may control white balancing processing of the image signal processing circuit 108 according to the block statistics value calculated by the block statistics unit 118. The control unit 120 according to the present exemplary embodiment may include a shading estimation unit 124 and a shading correction unit 126.

The shading estimation unit 124 may estimate shading according to the block statistical value determined by the block statistics unit 118 and the shading estimation coefficient stored in the coefficient storage unit 122, and select a shading estimation coefficient suitable for an image. According to the present exemplary embodiment, the shading estimation coefficient may be determined according to the light source, the R, G, and B values, or the block. A shading estimation coefficient group may mean a group of a plurality of shading estimation values set for each light source.

The shading correction unit 126 may determine, from the coefficient storage unit 122, a shading correction coefficient corresponding to the shading estimation coefficient determined by the shading estimation unit 124 and correct the shading of the captured image. According to the present exemplary embodiment, the image signal processing circuit 108 may correct the shading of the captured image by using the shading correction coefficient determined by the shading correction unit 126. The shading correction unit 126 may determine the shading correction coefficient according to the light source, the R, G, and B values, or the block.

The coefficient storage unit 122 may store a pair of the shading estimation coefficient and the shading correction coefficient with respect to each light source, such as solar light, a bulb, or a fluorescent lamp. The coefficient storage unit 122 according to the present exemplary embodiment may include an estimation coefficient storage unit and a correction coefficient storage unit. One shading estimation coefficient and one shading correction coefficient are paired, but the present exemplary embodiment is not limited thereto. The shading estimation coefficient and the shading correction coefficient may be calculated with respect to an external device such as a PC. The coefficient storage unit 122 may store a shading estimation coefficient group including a plurality of shading estimation coefficients corresponding to each light source, and may store a shading estimation coefficient group including a plurality of shading estimation coefficients having different correction strengths.

The shading estimation coefficient may be acquired by using an image of a white chart that is captured under each light source. The white chart may use a uniform diffusion/reflection surface of a standard white reflector that has 90% or more of constant spectral reflectance over an entire target wavelength region. For example, in the case of a light source such as a bulb having a large amount of infrared light, a shading estimation coefficient that strongly corrects an R signal of a peripheral portion of an image may be determined. In the case of a light source such as a fluorescent lamp having no separate infrared light, a shading estimation coefficient that weakly corrects an R signal of a peripheral portion of an image may be determined. According to the present exemplary embodiment, an initial shading estimation coefficient may be a default shading estimation coefficient that most weakly corrects an R signal of a peripheral portion of an image.

In addition, the image processing apparatus 100 according to the present exemplary embodiment may include the image signal processing circuit 108, the block statistics unit 118, the control unit 120, and the coefficient storage unit 122, but is not limited thereto.

In addition, the respective elements included in the control unit 120 may be implemented by executing a program under the control of an arithmetic device (not illustrated) included in the control unit 120 serving as a computer. Specifically, the control unit 120 may be implemented by loading a program stored in a storage unit (not illustrated) into a main memory (not illustrated) and executing the program under the control of the arithmetic device. That is, the respective elements may be implemented by software using the program, but the present exemplary embodiment is not limited thereto. The respective elements may also be implemented by combinations of hardware, firmware, and software.

The above-described program may be stored in various types of non-transitory computer-readable mediums and be provided to the computer. The non-transitory computer-readable mediums may include various types of tangible storage mediums. Examples of the non-transitory computer-readable mediums may include a magnetic recording medium (e.g., flexible disk, magnetic tape, hard disk drive, etc.), an optical magnetic recording medium (e.g., optical magnetic disk, etc.), CD-ROM, CD-R, CDR/W, and a semiconductor memory (e.g., mask read-only memory (ROM), programmable ROM (PROM), erasable PROM (EPROM), flash ROM, random access memory (RAM), etc.).

In addition, the program may be provided to the computer by various types of transitory computer-readable mediums. Examples of the transitory computer-readable medium may include an electric signal, an optical signal, and an electromagnetic wave. The transitory computer-readable medium may be provided to the computer through a wired communication channel or a wireless communication channel. Examples of the wired communication channel may include an electric wire and an optical fiber.

Figure 3:
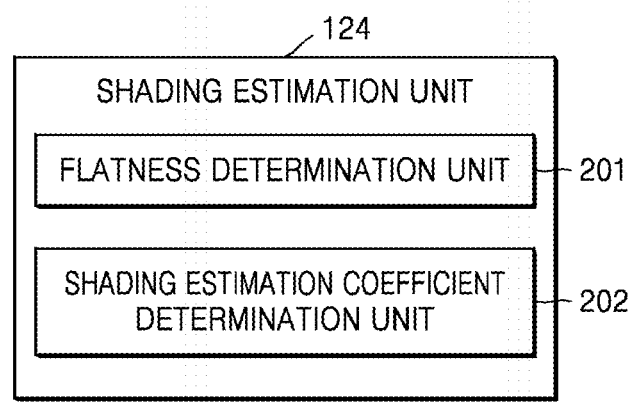
FIG. 3 is a block diagram of a shading estimation unit according to an exemplary embodiment.

FIG. 3 is a block diagram of the shading estimation unit 124 according to an exemplary embodiment.

Referring to FIG. 3, the shading estimation unit 124 may include a flatness determination unit 201 and a shading estimation coefficient determination unit 202, but is not limited thereto. For example, the shading estimation unit 124 may include a unit configured to calculate luminance (or brightness) of a subject and a unit configured to calculate a color temperature of the subject.

The shading estimation unit 124 may determine whether a photographed subject is flat. According to the present exemplary embodiment, the flatness determination unit 201 may determine whether the photographed subject is flat. The shading estimation unit 124 may select a shading estimation coefficient suitable for an image from a shading estimation coefficient group according to whether the subject is flat, or a capturing condition such as luminance (Bv) of the subject or a light source color temperature (R color gain). According to the present exemplary embodiment, the shading estimation coefficient determination unit 202 may select a shading estimation coefficient suitable for an image from a shading estimation coefficient group according to whether the subject is flat, or a capturing condition such as luminance (Bv) of the subject or a light source color temperature (R color gain).

Figure 4:
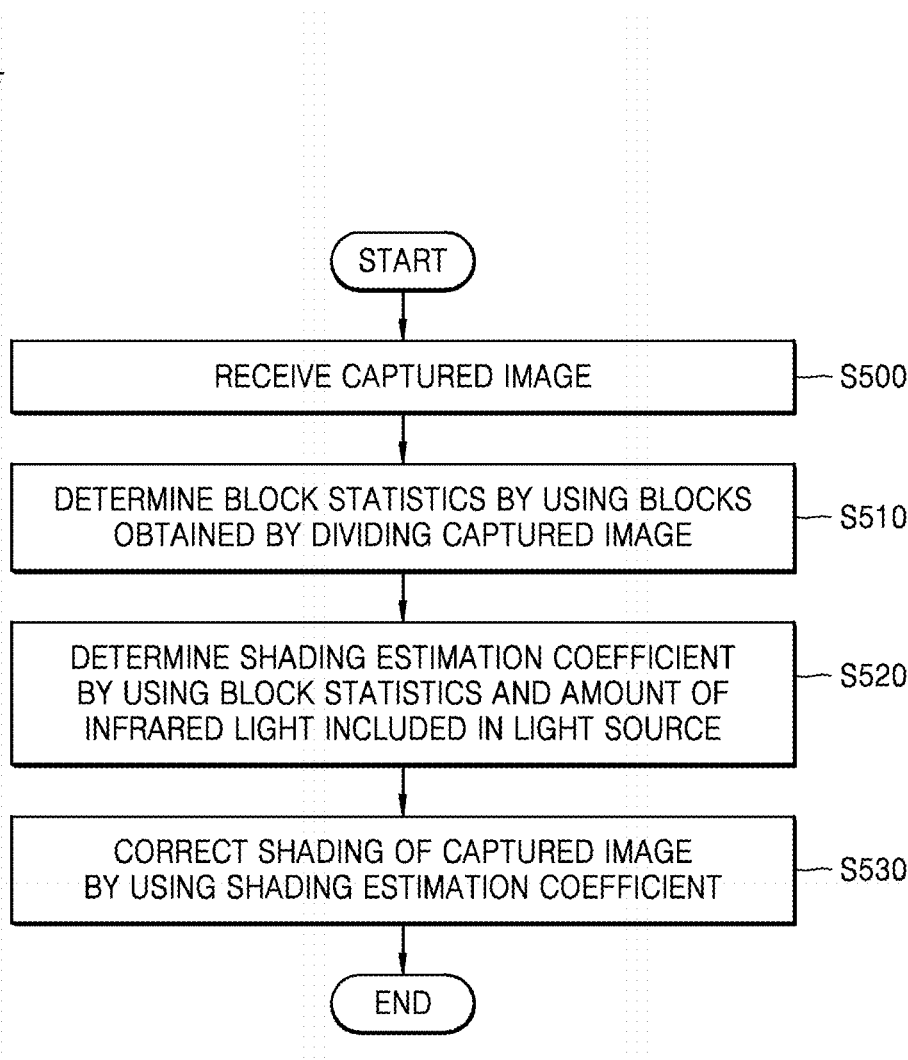
FIG. 4 is a flowchart of a method of operating an image processing apparatus, according to an exemplary embodiment.

FIG. 4 is a flowchart of a method of operating the image processing apparatus 100, according to an exemplary embodiment.

In operation S500, the image processing apparatus 100 may receive a captured image.

In operation S510, the image processing apparatus 100 may determine block statistics by using a plurality of blocks obtained by dividing the captured image. According to the present exemplary embodiment, the shading estimation unit 124 may determine the block statistics by using the plurality of blocks obtained by dividing the captured image.

In operation S520, the image processing apparatus 100 may determine a shading estimation coefficient by using the block statistics and an amount of infrared light included in a light source. According to the present exemplary embodiment, the shading estimation unit 124 may determine the shading estimation coefficient by using the block statistics and the amount of the infrared light included in the light source.

In operation S530, the image processing apparatus 100 may correct shading of the captured image by using the shading estimation coefficient. According to the present exemplary embodiment, the shading estimation unit 124 may correct the shading of the captured image by using the shading estimation coefficient.

Figure 5:
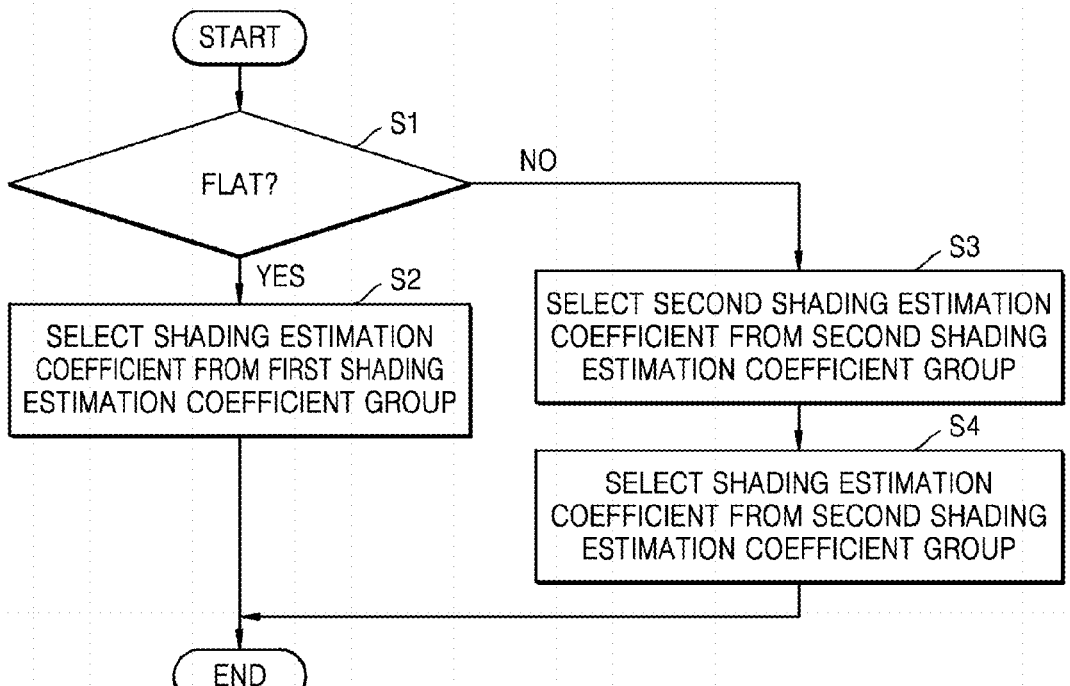
FIG. 5 is a flowchart of a method of operating a shading estimation unit, according to an exemplary embodiment.

FIG. 5 is a flowchart of a method of operating the shading estimation unit 124, according to an exemplary embodiment.

The shading estimation unit 124 may include the operation of the flatness determination unit 201 described with reference to FIG. 5. In addition, the shading estimation unit 124 may include the operation of the shading estimation coefficient determination unit 202 of FIG. 5.

In operation S1, the flatness determination unit 201 may determine whether the photographed subject is flat. The flatness determination unit 201 may determine whether the photographed subject is flat by calculating a degree of change in a pixel value due to the subject in a partial region, except for a change in a pixel value due to shading having already occurred in the image. In addition, the flatness determination unit 201 may determine the luminance of the subject or the color temperature of the subject.

In operation S2, when it is determined in operation S1 that the photographed subject is flat, the shading estimation coefficient determination unit 202 may determine a shading estimation coefficient, of which an evaluation value (Ed) is smallest, from a first shading estimation coefficient group. According to the present exemplary embodiment, the evaluation value (Ed) may be calculated by Formula 13 below.

Table 1 below shows an example of the first shading estimation coefficient group including six types of shading estimation coefficients (or shading estimation tables) corresponding to six types of light sources, according to an exemplary embodiment.

TABLE 1

| Table Number | Light Source | Infrared Light |
| --- | --- | --- |
| 0 | Fluorescent Lamp | Small |
| 1 | Solar Light + Fluorescent | ↑ |
| 2 | Lamp Solar Light |  |
| 3 | Solar Light + Bulb | ↓ |
| 4 | Bulb |  |
| 5 | Sunset | Large |

Referring to Table 1, as a table number increases, a shading estimation coefficient may have a stronger R correction strength with respect to a light source having a larger amount of infrared light.

In operation S3, when it is determined in operation S1 that the photographed subject is non-flat, the shading estimation coefficient determination unit 202 may determine a second shading estimation coefficient group from the first shading estimation coefficient group. Specifically, the shading estimation coefficient determination unit 202 may select at least one shading estimation coefficient from the first shading estimation coefficient group and set the selected at least one shading estimation coefficient as the second shading estimation coefficient group.

In operation S4, the shading estimation coefficient determination unit 202 may select a shading estimation coefficient, of which an evaluation value (Ed) is smallest, from the second shading estimation coefficient group.

In addition, when the second shading estimation coefficient group is selected, the shading estimation coefficient determination unit 202 may select a shading estimation coefficient suitable for an image from the shading estimation coefficient group according to the capturing condition such as the luminance (Bv) of the subject or the light source color temperature (R color gain).

Table 2 below shows an example of selecting the second shading estimation coefficient group according to the luminance (Bv) of the subject or the light source color temperature (R color gain), according to an exemplary embodiment.

TABLE 2

| Condition 1 | Condition 2 | Shading Estimation Coefficient |
| --- | --- | --- |
| Flat subject, or luminance of subject < indoor threshold | light source color temperature < bulb color threshold | Shading estimation coefficients of the entire light sources (e.g., table numbers 0 to 5) |
|  | light source color temperature ≥ bulb color threshold | Shading estimation coefficient other than bulb-color-series light source (e.g., table numbers 0 to 3) |

TABLE 2-continued

| Condition 1 | Condition 2 | Shading Estimation Coefficient |
|---|---|---|
| Non-flat subject | indoor threshold ≤ luminance of subject ≤ outdoor threshold | Shading estimation coefficient of outdoor light source (e.g., table numbers 1 to 3) |
| | luminance of subject > outdoor threshold | Shading estimation coefficient of outdoor light source (e.g., table numbers 1 and 2) |

Referring to Table 2, the second shading estimation coefficient group may be selected by applying condition 1 and condition 2 to preset bulb color threshold (R gain limit threshold), indoor threshold (indoor By threshold), and outdoor threshold (outdoor By threshold). According to the present exemplary embodiment, when it is determined that the captured image is flat (that is, the subject is flat) and when it is determined that the captured image is the indoor image according to the luminance (Bv) of the subject (that is, Bv<indoor threshold), the second shading estimation coefficient group may be selected from the first shading estimation coefficient group according to the light source color temperature (R color gain). On the other hand, when it is determined that the captured image is non-flat (that is, the subject is non-flat), the second shading estimation coefficient group may be selected from the first shading estimation coefficient group according to the luminance (Bv) of the subject.

Specifically, when the subject is flat and the luminance of the subject<the indoor threshold in condition 1 and the light source color temperature<the bulb color threshold in condition 2, the shading estimation coefficients of the entire light sources (that is, table numbers 0 to 5) may be selected as the second shading estimation coefficient group from the first shading estimation coefficient group of Table 1. In addition, when the subject is flat and the luminance of the subject<the indoor threshold in condition 1 and the light source color temperature≥the bulb color threshold in condition 2, the shading estimation coefficients (that is, table numbers 0 to 3) other than the bulb-color-series light source of Table 1 may be selected as the second shading estimation coefficient group.

In addition, when the subject is non-flat in condition 1 and the indoor threshold≤the luminance of the subject≤the outdoor threshold in condition 2, the shading estimation coefficients (that is, table numbers 1 to 3) of the outdoor light source of Table 1 may be selected as the second shading estimation coefficient group. In addition, when the subject is non-flat in condition 1 and the luminance of the subject>the outdoor threshold in condition 2, the shading estimation coefficients (that is, table numbers 1 and 2) of the outdoor light source of Table 1 may be selected as the second shading estimation coefficient group.

Figure 6:
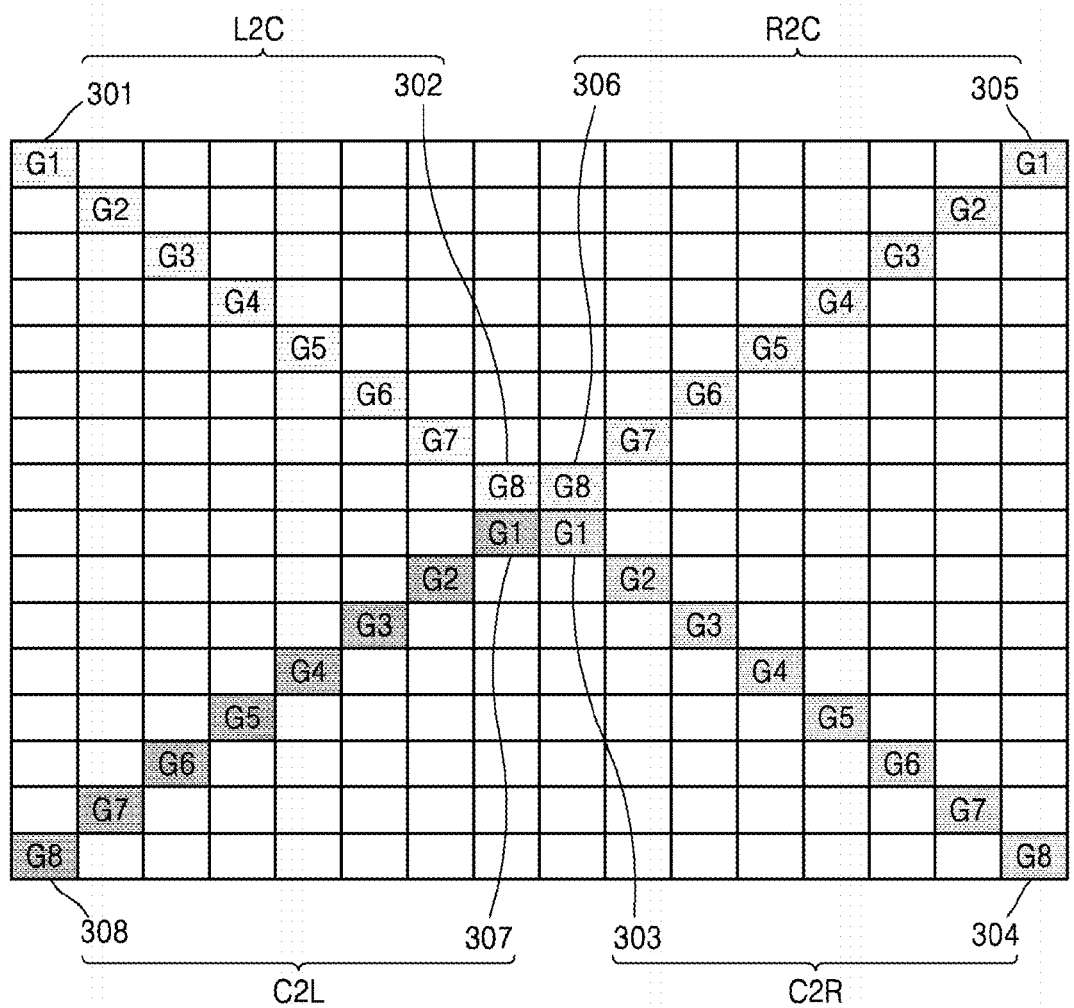
FIG. 6 is a diagram illustrating an example of an image for describing an operation of a flatness determination unit, according to an exemplary embodiment.

FIG. 6 is a diagram illustrating an example of an image for describing the operation of the flatness determination unit 201, according to an exemplary embodiment.

The shading estimation unit 124 may include the operation of the flatness determination unit 201 described with reference to FIG. 6.

Referring to FIG. 6, the flatness determination unit 201 according to the present exemplary embodiment may determine an image flatness by summing up differences of characteristic values of blocks continuous from a peripheral portion to a central portion of a captured image.

The flatness determination unit 201 according to the present exemplary embodiment may determine whether the subject is flat by using G values of blocks positioned on diagonal lines of an image. Referring to FIG. 6, the image may be divided by four lines such that the blocks on the diagonal lines of the image become blocks to be determined. For example, blocks from a left upper block 301 to a central block 302 on a line L2C extending from a left upper portion to a central portion of the image, blocks from a central block 303 to a right lower block 304 on a line C2R extending from a central portion to a right lower portion of the image, blocks from a right upper block 305 to a central block 306 on a line R2C extending from a right upper portion to a central portion of the image, and blocks from a central block 307 to a left lower block 308 on a line C2L extending from a central portion to a left lower portion of the image may be blocks to be determined. Therefore, the lines dividing the image in FIG. 6 are the lines extending from the corners to the center of the image and the lines diagonally extending from the center of the image, but are not limited thereto.

The flatness determination unit 201 according to the present exemplary embodiment may determine whether the subject is flat by using Formulas 1 to 3 below.

According to the present exemplary embodiment, upG and dwG may be expressed as Formula 1 below.

[Formula 1]

$$deltaG = G_{i+1} - G_i \\ upG = \sum_{i=1}^{n-1} deltaG \quad \text{if } deltaG > 0 \\ dwG = \sum_{i=1}^{n-1} deltaG \quad \text{if } deltaG < 0 \qquad (1)$$

In Formula 1 above, deltaG is a difference value between $G_{i+1}$, which is a G value of an (i+1)th block, and $G_i$, which is a G value of an ith block. upG is the sum of deltaG when deltaG is greater than 0, and dwG is the sum of deltaG when deltaG is less than 0.

With regard to the blocks from the right upper block 305 to the central block 306 and the blocks from the central block 307 to the left lower block 308, Formula 1 may be also used.

In addition, the flatness determination unit 201 may use the result of Formula 1 to determine a line evaluation value (El1) between the line L2C and the line C2R and a line evaluation value (El2) between the line R2C and the line C2L.

According to the present exemplary embodiment, El1 and El2 may be expressed as Formula 2 below.

[Formula 2]

$$El1 = |L2C\_upG + C2R\_dwG| + |L2C\_dwG + C2R\_upG| \qquad (2) \\ El2 = |R2C\_upG + C2L\_dwG| + |R2C\_dwG + C2L\_upG|$$

In Formula 2, L2C is a line from the left upper block 301 to the central block 302, L2C_upG is the sum of deltaG when deltaG is greater than 0, and L2C_dwG is the sum of deltaG when deltaG is less than 0. C2R is a line from the central block 303 to the right lower block 304, C2R_upG is the sum of deltaG when deltaG is greater than 0, and C2R_dwG is the sum of deltaG when deltaG is less than 0. R2C is a line from the right upper block 305 to the central block 306, R2C_upG is the sum of deltaG when deltaG is greater than 0, and R2C_dwG is the sum of deltaG when deltaG is less than 0. In addition, C2L is a line from the central block 307 to the left lower block 308, C2L_upG is the sum of deltaG when deltaG is greater than 0, and C2L_dwG is the sum of deltaG when deltaG is less than 0.

The flatness determination unit 201 may determine a flatness evaluation value (Ef) by using the result of Formula 2.

According to the present exemplary embodiment, the flatness evaluation value (Ef) may be expressed as Formula 3 below.

[Formula 3]

$$Ef = El1 + El2 \quad (3)$$

Based on the result of Formula 3, the flatness determination unit 201 may determine the corresponding subject as a flat subject when the flatness determination value (Ef) is less than a predetermined threshold (i.e., a flatness threshold value) and may determine the corresponding subject as a non-flat subject when the flatness evaluation value (Ef) is equal to or greater than the predetermined threshold (i.e., the flatness threshold value).

Figure 7:
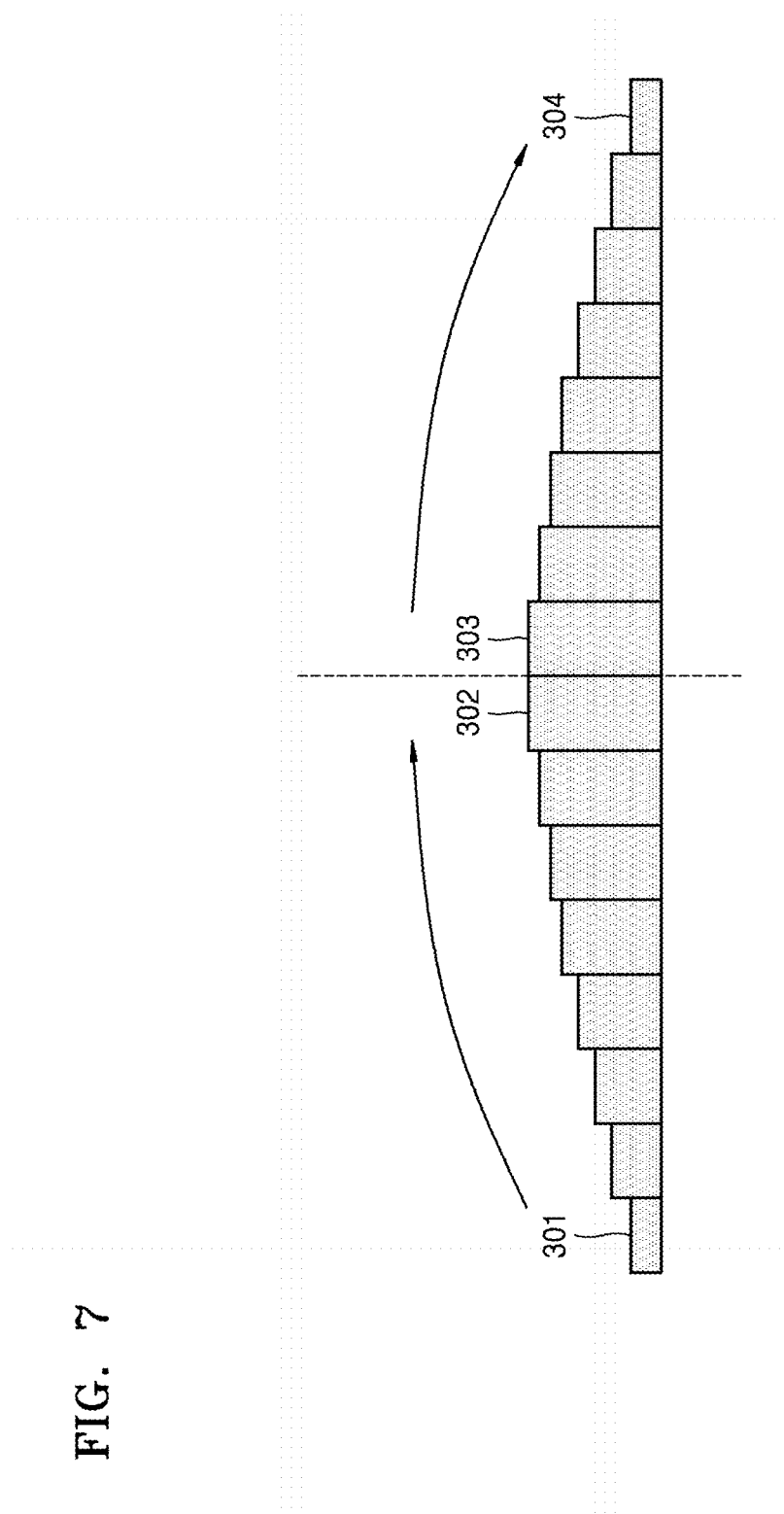
FIG. 7 is a diagram illustrating an example of a pixel value for describing an operation of a flatness determination unit, according to an exemplary embodiment.

FIG. 7 is a diagram illustrating an example of pixel values for describing the operation of the flatness determination unit 201, according to an exemplary embodiment.

Referring to FIG. 7, with regard to the G values of the blocks on the diagonal lines of the image, deltaG is greater than 0 in the blocks from the left upper block 301 to the central block 302, and deltaG is less than 0 in the blocks from the central block 303 to the right lower block 304. Referring to FIG. 7 and Formula 1, the sum of upG and dwG may be close to 0. That is, if the subject is flat, the sum of upG and dwG may be close to 0.

Figure 8:
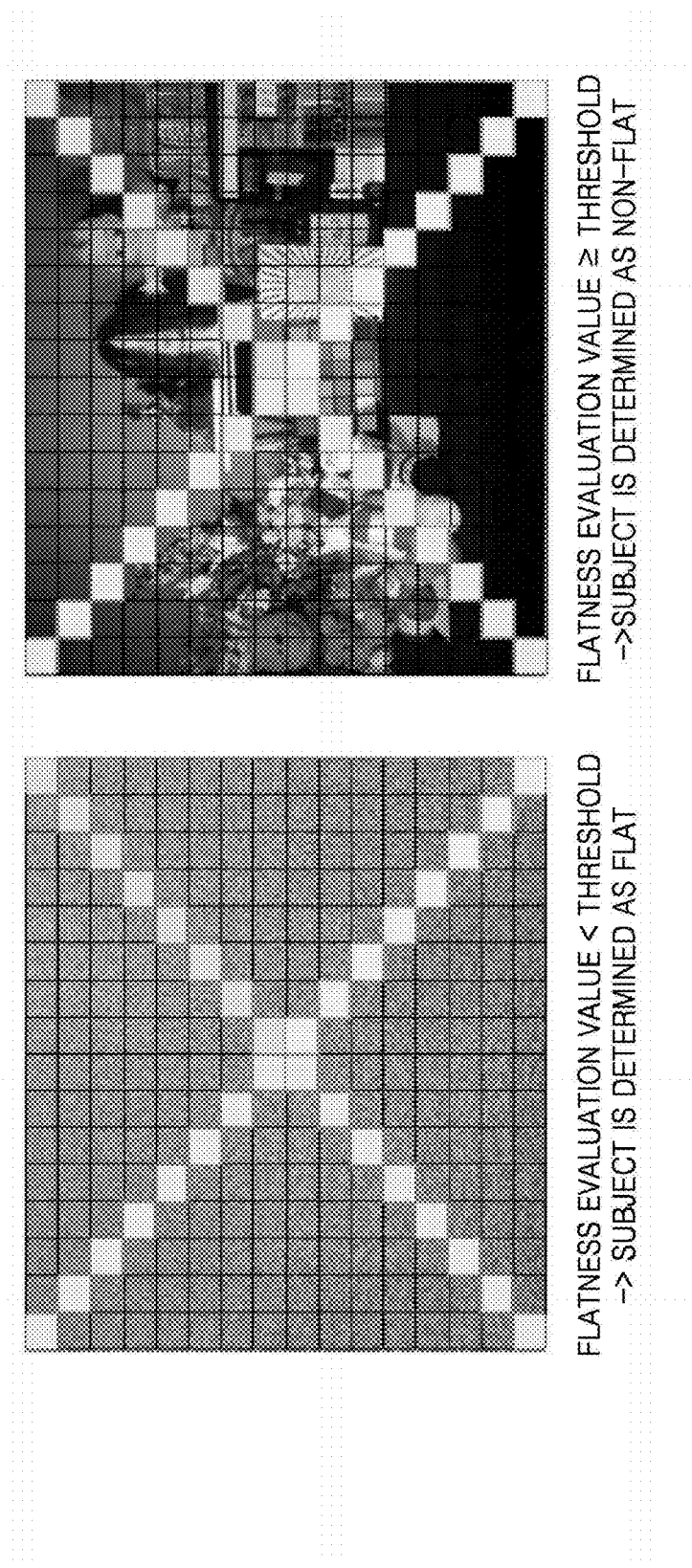
FIG. 8 is a diagram illustrating an example of an image for describing an operation of a flatness determination unit, according to an exemplary embodiment.

FIG. 8 is a diagram illustrating an example of an image for describing the operation of the flatness determination unit 201, according to an exemplary embodiment.

The shading estimation unit 124 may include the operation of the flatness determination unit 201 described with reference to FIG. 8.

Figure 9:
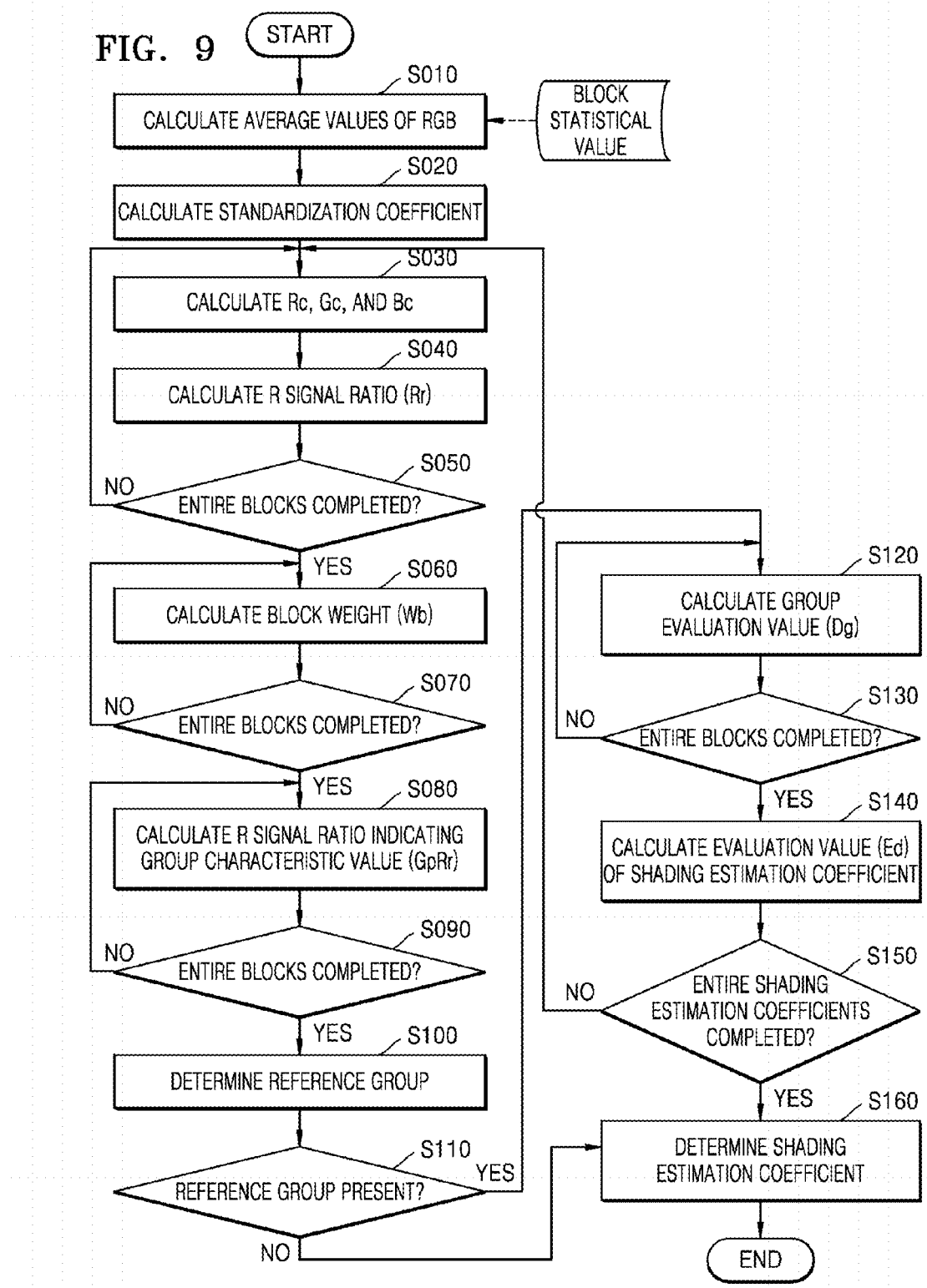
FIG. 9 is a flowchart of a method of operating a shading estimation coefficient determination unit, according to an exemplary embodiment.

In FIG. 8A, since the flatness evaluation value (Ef) is less than the flatness threshold, the flatness determination unit 201 may determine the subject as being flat. In FIG. 8B, since the flatness evaluation value (Ef) is equal to or greater than the flatness threshold, the flatness determination unit 201 may determine the subject as being non-flat FIG. 9 is a flowchart of a method of operating the shading estimation coefficient determination unit 202, according to an exemplary embodiment.

The shading estimation unit 124 may include the operation of the shading estimation coefficient determination unit 202 described with reference to FIG. 9.

The shading estimation coefficient determination unit 202 according to the present exemplary embodiment selects a shading estimation coefficient from the first and second shading estimation coefficient groups, but is not limited thereto.

In operation S010, the shading estimation coefficient determination unit 202 may determine average values (Rav, Gav, and Bav) of the R, G, and B values of the entire blocks by using the block statistical value that the block statistics unit 118 obtains from the image to be subjected to shading correction.

In operation S020, the shading estimation coefficient determination unit 202 may determine standardization coefficients (Rg, Gg, and Bg) of the R, G, and B values.

According to the present exemplary embodiment, the standardization coefficients (Rg, Gg, and Bg) of the R, G, and B values may be expressed as Formula 4 below.

[Formula 4]

$$\left.\begin{aligned} Vav &= \max(Rav, Gav, Bav) \\ Rg &= Vav/Rav \\ Gg &= Vav/Gav \\ Bg &= Vav/Bav \end{aligned}\right\} \quad (4)$$

In Formula 4 above, the standardization coefficients (Rg, Gg, and Bg) of the R, G, and B values may be coefficients for matching the RGB balance of the entire image and may be gains for standardizing the image.

In operation S030, the shading estimation coefficient determination unit 202 may calculate Rc[t](x,y), Gc[t](x,y), and Bc[t](x,y).

According to the present exemplary embodiment, Rc[t](x,y), Gc[t](x,y), and Bc[t](x,y) may be expressed as Formula 5 below.

[Formula 5]

$$\left.\begin{aligned} Rc_{[t](x,y)} &= R_{(x,y)} \cdot Cr_{[t](x,y)} \cdot Rg \\ Gc_{[t](x,y)} &= G_{(x,y)} \cdot Cg_{[t](x,y)} \cdot Gg \\ Bc_{[t](x,y)} &= B_{(x,y)} \cdot Cb_{[t](x,y)} \cdot Bg \end{aligned}\right\} \quad (5)$$

In Formula 5, Rc[t](x,y) may be obtained by the product of the block statistical value R(x,y) of the R value, the shading estimation coefficient Cr[t](x,y) of the R value with respect to B(x,y), and the standardization coefficient Rg of the R value, Gc[t](x,y) may be obtained by the product of the block statistical value G(x,y) of the G value, the shading estimation coefficient Cg[t](x,y) of the G value with respect to B(x,y), and the standardization coefficient Gg of the G value, and Bc[t](x,y) may be obtained by the product of the block statistical value B(x,y) of the B value, the shading estimation coefficient Cb[t](x,y) of the B value with respect to B(x,y), and the standardization coefficient Bg of the B value.

According to the present exemplary embodiment, in operation S030, the shading estimation coefficient may use an initial shading estimation coefficient. According to the present exemplary embodiment, the initial shading estimation coefficient may be a default shading estimation coefficient that most weakly corrects the R signal of the peripheral portion of the image. As the shading estimation coefficient is more suitable for the image, Rc[t](x,y), Gc[t](x,y), and Bc[t](x,y) may be equal to one another and may be closer to 1.0. When Rc[t](x,y), Gc[t](x,y), and Bc[t](x,y) are displayed as an image, the image may be only gray.

In operation S040, the shading estimation coefficient determination unit 202 may calculate an R signal ratio (Rr[t](x,y)) indicating a block characteristic value.

According to the present exemplary embodiment, the R signal ratio (Rr[t](x,y)) may be expressed as Formula 6 below.

[Formula 6]

$$Rr_{[t](x,y)} = Rc_{[t](x,y)} / Gc_{[t](x,y)} \quad (6)$$

On the other hand, according to the present exemplary embodiment, the denominator in Formula 6 may be the sum of Rc[t](x,y), Gc[t](x,y), and Bc[t](x,y). In addition, Rr[t](x,y) may be added to the R signal ratio or may use a B signal ratio instead of the R signal ratio.

Referring to Formula 6, since the R signal ratio is obtained with respect to the RGB image to which the standardization coefficients are applied, the R signal ratio may have a value close to 1.0 as the shading estimation coefficient is more suitable for the image even in the case of a chromatic-color subject, for example, a subject whose entire image is red. On the other hand, as the shading estimation coefficient is less suitable for the image, the R signal ratio may have a value far from 1.0.

In operation S060, the shading estimation coefficient determination unit 202 may calculate a difference Rd(x,y) of the R signal ratio between a current block and an adjacent block by using a spatial filter (m) and calculate a block weight (Wb(x,y)) by using the calculated difference Rd(x,y).

According to the present exemplary embodiment, the spatial filter (m) may be expressed as Formula 7 below.

[Formula 7]

$$m = \begin{bmatrix} 0.10 & 0.15 & 0.10 \\ 0.15 & -1.0 & 0.15 \\ 0.10 & 0.15 & 0.10 \end{bmatrix} \quad (7)$$

According to the present exemplary embodiment, Rd(x,y) may be expressed as Formula 8 below.

[Formula 8]

$$Rd(x,y) = \sum_{i=-1}^{1} \sum_{j=-1}^{1} Rr(x+i, y+j) \cdot m(i,j) \quad (8)$$

According to the present exemplary embodiment, the block weight (Wb(x,y)) may be expressed as Formula 9 below.

[Formula 9]

$$Wb(x,y) = 1.0 - \left| \frac{Rd(x,y)}{Rd_{max}} \right| \quad (9)$$

In Formula 9, $R_{dmax}$ represents a maximum value of the difference (Rd(x,y)) of the R signal ratio. Referring to FIG. 9, the block weight may increase when a change in the image is small and smooth by reflecting the complexity of the photographed subject and the complexity of a partial region of the image to the block weight, that is, when the similarity between the blocks is large. The block weight may decrease when the change in the image is large, that is, when the similarity between the blocks is small. In addition, Wb(x,y) may be added to the R signal ratio, or a B signal ratio may be used instead of the R signal ratio.

In operation S080, the shading estimation coefficient determination unit 202 may calculate an R signal ratio (GpRr[j]) indicating a group characteristic value.

According to the present exemplary embodiment, the R signal ratio (GpRr[j]) indicating the group characteristic value may be expressed as Formula 10 below.

[Formula 10]

$$GpRr[j] = \frac{1}{n} \sum_{i=0}^{n-1} Rr(i) \cdot Wb(x,y) \quad (10)$$

The R signal ratio (GpRr[j]) indicating the group characteristic value may be determined by weighted average of the R signal ratio (Rr(i)) of the block included in the group by using Wb(x,y). Referring to Formula 10, by using the block weight (Wb(x,y)) based on the similarity between the current block and the adjacent block, the group characteristic value may be calculated by putting higher emphasis on a characteristic value of a block having a small change in the image or a region formed by the block. For example, in an image of a green leaf, a red flower, a sky, or a building, a characteristic value of a block or a region where the sky or the building is present may be more emphasized than a characteristic value of a block or a region adjacent to the green leaf and the red flower.

In operation S100, the shading estimation coefficient determination unit 202 may select a reference group. The shading estimation coefficient determination unit 202 may search for outer groups sequentially from a group of a central portion of an image and determines one group as the reference group.

According to the present exemplary embodiment, the reference group may be expressed as Formula 11 below.

[Formula 11]

$$Th1 < GpRr_{[i]} < Th2 \quad (11)$$

According to the present exemplary embodiment, a group that satisfies Formula 11 for the first time in the R signal ratio (GpRr[j]) indicating the group characteristic value may be selected as the reference group. The reference group thresholds (Th1 and Th2) may be set to include 1.0 therebetween. For example, the reference group thresholds (Th1, Th2) may be set to 0.9 and 1.1. Since the reference group is selected after the standardization coefficient is applied, the present exemplary embodiment is not limited to the case of an achromatic-color subject. Even in the case of a chromatic-color subject, the reference group may be selected.

In operation S110, the shading estimation coefficient determination unit 202 may determine whether the reference group is present.

In operation S120, when it is determined in operation S110 that the reference group is present, the shading estimation coefficient determination unit 202 may calculate a group evaluation value (Dg[j+k]). According to the present embodiment, the group evaluation value may be calculated with respect to each group disposed outside the reference group selected in operation S100. For example, when group 1 is selected as the reference group in FIG. 10, the shading estimation coefficient determination unit 202 may calculate the group evaluation value with respect to groups 2 to 5 disposed outside group 1.

According to the present exemplary embodiment, the group evaluation value (Dg[j+k]) may be calculated using Formula 12 below.

[Formula 12]

$$Dg_{[j+k]} = (GpRr_{[j]} - GpRr_{[j+k]}) \cdot Wg_{[j+k]} \quad (12)$$

Referring to Formula 12, each group evaluation value (Dg[j+k]) may be determined by multiplying a weight (Wg[j+k]) of a preset outer group by a difference between an R signal ratio (GpRr[j]) indicating a group characteristic value of the reference group and an R signal ratio (GpRr[j+k]) indicating a group characteristic value of an outer group.

In addition, according to the present exemplary embodiment, each group evaluation value (Dg[j+k]) may be determined by only the difference between the R signal ratio (GpRr[j]) indicating the group characteristic value of the reference group and the R signal ratio (GpRr[j+k]) indicating the group characteristic value of the outer group, without multiplying the weight (Wg[j+k]) of the preset outer group.

Table 3 below shows an example of the weight (Wg) of the group, according to an exemplary embodiment.

TABLE 3

| Group | Weight (Wg) |
|---|---|
| 1 | 0.2 |
| 2 | 0.4 |
| 3 | 0.6 |
| 4 | 0.8 |
| 5 | 1.0 |

The weight (Wg) is large in the group of the peripheral portion of the image. Therefore, it is possible to more accurately evaluate whether the shading estimation coefficient is suitable for the shading correction of the peripheral portion of the image.

In operation S140, the shading estimation coefficient determination unit 202 may take the sum of absolute values of the group evaluation values (Dg[j+k]) and calculate an evaluation value (Ed) of the shading estimation coefficient for determining whether the shading estimation coefficient used in operation S303 is suitable.

According to the present exemplary embodiment, the evaluation value (Ed) of the shading estimation coefficient may be expressed as Formula 13 below.

[Formula 13]

$$Ed = \sum_{i=1}^{g} |Dg[i]| \quad (13)$$

The evaluation value (Ed) of the shading estimation coefficient is to extract the characteristic of the R signal ratio attenuating across the peripheral portion from the central portion of the image and may be an index for determining whether the shading estimation coefficient used in operation S030 is suitable for the image to be subjected to the shading correction.

In addition, according to the present exemplary embodiment, the evaluation value (Ed) of the shading estimation coefficient may be calculated by using a statistical value of a group evaluation value different from Formula 13, such as a variance of a group evaluation value.

In operation S150, the shading estimation coefficient determination unit 202 may determine whether the evaluation value (Ed) of the shading estimation coefficient has been calculated with respect to the entire shading estimation coefficients (that is, shading estimation coefficients included in the first shading estimation coefficient group or the second shading estimation coefficient group).

When it is determined in operation S150 that the evaluation value (Ed) of the shading estimation coefficient has not been calculated with respect to the entire shading estimation coefficients, the process returns to operation S030 to repeat operations S030 to S150 with respect to the shading estimation coefficients in which the evaluation value (Ed) of the shading estimation coefficient has not been calculated.

According to the present exemplary embodiment, when the evaluation value (Ed) of the shading estimation coefficient, except for the initial shading estimation coefficient, is calculated, operation S100 of selecting the reference group and operation S110 of determining whether the reference group is present may not be performed. The reference group selected when the evaluation value (Ed) of the initial shading estimation coefficient is calculated may be selected as the reference group of when the evaluation value (Ed) of the shading estimation coefficient, except for the initial shading estimation coefficient, is calculated.

In operation S160, the shading estimation coefficient determination unit 202 may select a shading estimation coefficient, which makes an evaluation value (Ed) of a shading estimation coefficient smallest, from the entire shading estimation coefficients including the initial shading estimation coefficient.

When it is determined in operation S110 that the reference group is not present, the shading estimation coefficient determination unit 202 may calculate the initial shading estimation coefficient as the shading estimation coefficient.

According to the present exemplary embodiment, the shading correction coefficient may use the same value as the shading estimation coefficient or may use a value different from the shading estimation coefficient.

In addition, according to the present exemplary embodiment, the shading estimation coefficient may be evaluated by using an RGB color space and other color spaces such as HSV, so as to evaluate the shading estimation coefficient. Specifically, when the block weight, which is the similarity between the blocks, is calculated, an RGB value may be converted into HSV, and the block weight may be calculated according to a change in the luminance or chroma between the blocks.

In addition, according to the present exemplary embodiment, the shading estimation coefficient determination unit 202 performs operations from operation S100 of selecting the reference group to operation S150 of determining the evaluation value of the shading estimation coefficient, but the shading estimation coefficient determining unit 202 may divide the image, which is to be subjected to the shading correction, into a plurality of regions and perform operations from selecting of the reference group with reference to each region to the determining of the evaluation value of the shading estimation coefficient.

FIG. 10 is a diagram illustrating an example of a group classified by the shading estimation coefficient determination unit 202, according to an exemplary embodiment.

The shading estimation unit 124 may include the operation of the shading estimation coefficient determination unit 202 described with reference to FIG. 10.

The shading estimation coefficient determination unit 202 may classify blocks into a plurality of groups according to a distance from a central portion of an image 400, the blocks being obtained by dividing an image region in a grid shape by the block statistics unit 118. Referring to FIG. 10, the blocks of the image 400 may be classified into six groups, i.e., group 0 to group 5, along a peripheral portion of the image 400 from a central portion of the image 400. In order to select a reference group, the searching may be started from group 0 illustrated in FIG. 10 and the searching may be performed until group 3 that is considered as not being affected by shading.

Figure 11:
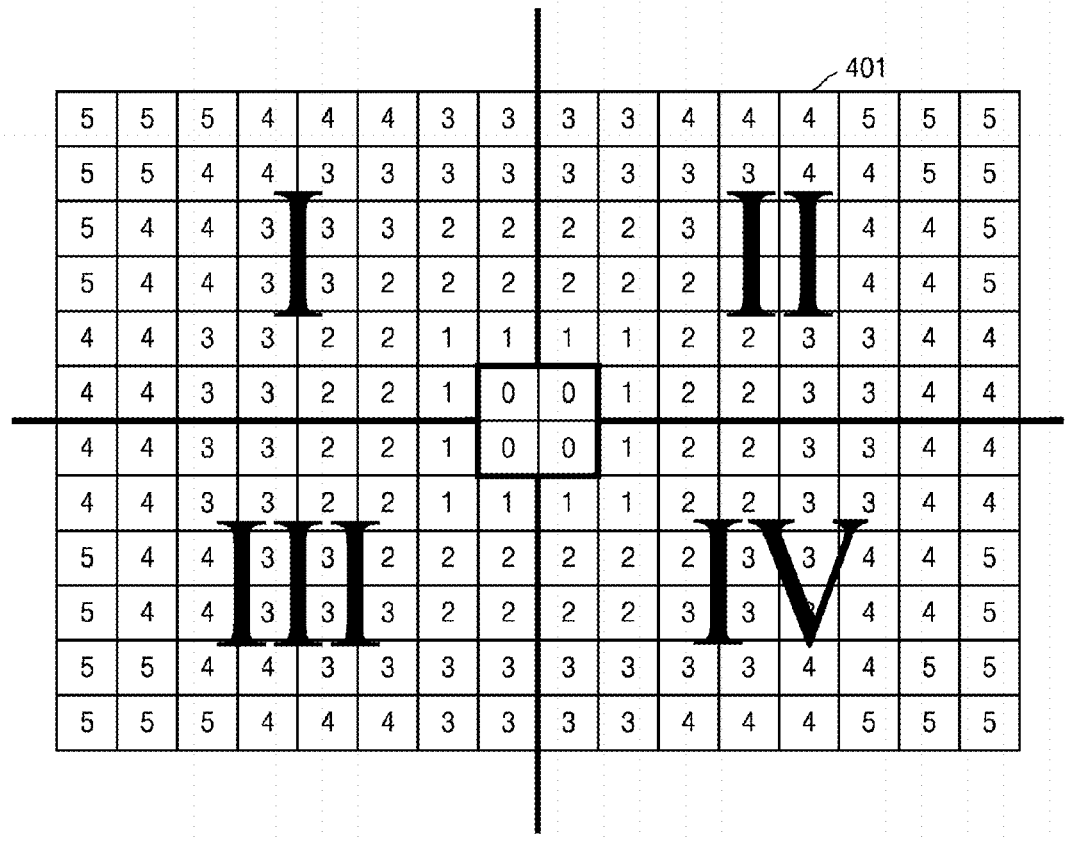
FIG. 11 is a diagram illustrating an example of groups classified by a shading estimation coefficient determination unit, according to another exemplary embodiment.

FIG. 11 is a diagram illustrating an example of groups classified by the shading estimation coefficient determination unit 202, according to another exemplary embodiment.

The shading estimation unit 124 may include the operation of the shading estimation coefficient determination unit 202 described with reference to FIG. 11.

The shading estimation coefficient determination unit 202 may divide an image 410 into four regions I to IV and classify blocks of the regions I to IV into a plurality of groups according to a distance from a central portion of the image 410. Referring to FIG. 11, the blocks of the region I may be classified into five groups, i.e., groups 1-1 to 1-5. The shading estimation coefficient determination unit 202 may perform operations from the selecting of the reference group in each of the regions I to IV to the determining of the evaluation value of the shading estimation coefficient. Therefore, it is possible to determine the evaluation value of each shading estimation coefficient with respect to each of the regions I to IV and select the shading estimation coefficient suitable for the subject with respect to each of the regions I to IV.

Figure 12:
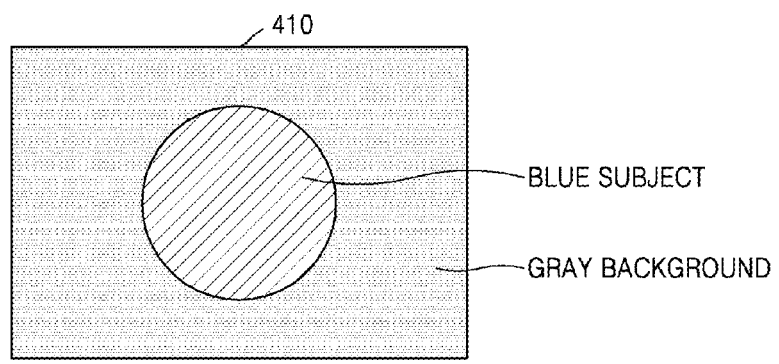
FIG. 12 is a diagram illustrating an example of an image including a flat subject in which two or more colors coexist, according to an exemplary embodiment.

FIG. 12 is a diagram illustrating an example of an image 410 including a flat subject in which two or more colors coexist, according to an exemplary embodiment.

Referring to FIG. 12, the image 410 includes a gray background and a blue flat subject. In this case, the shading estimation unit 124 of FIG. 3 may not select the shading estimation coefficient suitable for the image 410 of FIG. 12. For example, in an uncomplicated monotonous scene in which flat subjects of different colors, such as blue and red colors, coexist, a block characteristic similarity of an adjacent block is high. Hence, the corresponding subject may not be determined as a complicated subject. However, in this case, since flat portions of different colors have the same weight, the flat portions may be affected by the color of the subject, causing a shading estimation error.

Figure 13:
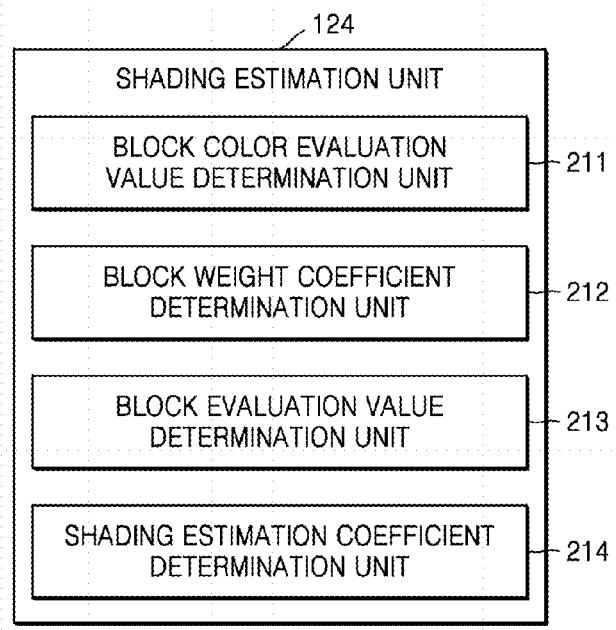
FIG. 13 is a block diagram of a shading estimation unit according to another exemplary embodiment.

FIG. 13 is a block diagram of a shading estimation unit 124 according to another exemplary embodiment.

According to the present exemplary embodiment, the shading estimation unit 124 may reduce a shading estimation coefficient selection error in a locally uncomplicated and monotonous image in which a plurality of colors coexist. Specifically, the shading estimation unit 124 may estimate a shading correction coefficient suitable for an image by extracting and evaluating a block of a color occupying a large area in the image.

Referring to FIG. 13, the shading estimation unit 124 may include a block color evaluation value determination unit 211, a block weight coefficient determination unit 212, a block evaluation value determination unit 213, and a shading estimation coefficient determination unit 214, but is not limited thereto. For example, in the shading estimation unit 124, the block color evaluation value determination unit 211 and the block weight coefficient determination unit 212 may be integrated as one block.

The shading estimation unit 124 may include the operation of the block color evaluation value determination unit 211. The shading estimation unit 124 may include the operation of the block weight evaluation value determination unit 212. The shading estimation unit 124 may include the operation of the block evaluation value determination unit 213. In addition, the shading estimation unit 124 may include the operation of the shading estimation coefficient determination unit 214.

The block color evaluation value determination unit 211 may determine a block color evaluation value (Hb) by using a block statistical value and an average gain. The block weight coefficient determination unit 212 may calculate a histogram weight from the block color evaluation value (Hb) and determine a block weight (Wb) by using the histogram weight and a G level weight. The block evaluation value determination unit 213 may determine a block evaluation value (Eb) by using the block statistical value and the block weight (Wb). The shading estimation coefficient determination unit 214 may determine a group evaluation value by using the block evaluation value (Eb) and determine a shading estimation coefficient according to a variation in the group evaluation value.

Figure 14:
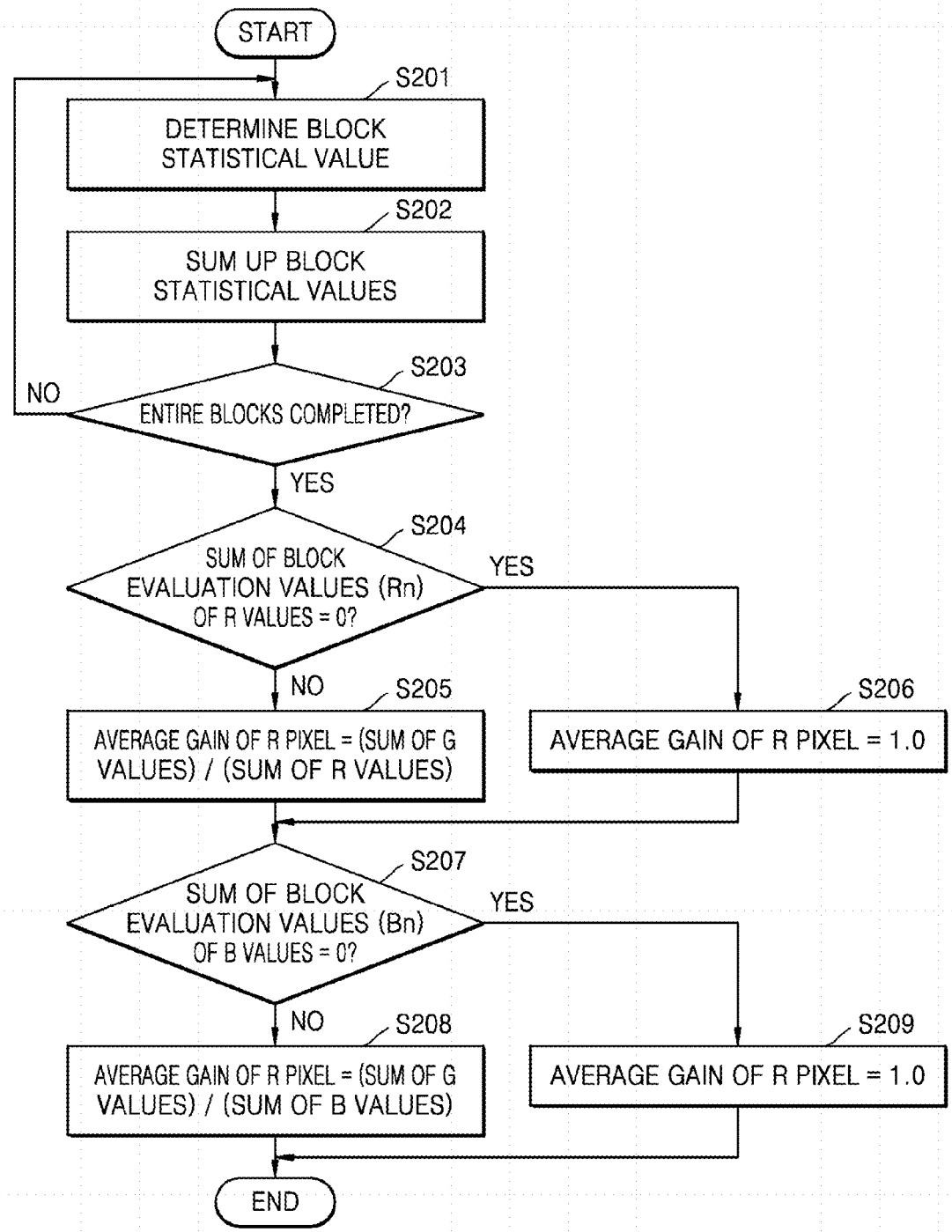
FIG. 14 is a flowchart of a method of operating a block color evaluation value determination unit, according to an exemplary embodiment.

FIG. 14 is a flowchart of a method of operating the block color evaluation value determination unit 211, according to an exemplary embodiment.

The shading estimation unit 124 may include the operation of the block color evaluation value determination unit 211 described with reference to FIG. 14.

According to the present exemplary embodiment, the block color evaluation value determination unit 211 may determine a block of a color occupying a large area in the image.

In operation S201, the block color evaluation value determination unit 211 may determine block statistical values (Rn(N,M), Gn(N,M), and Bn(N,M)) of R, G, and B values by multiplying an initial shading estimation coefficient by bock statistical values (Ri, Gi, and Bi) of R, G, and B values prior to the shading correction. Due to operation S201, the block color evaluation value determination unit 211 may reduce the shading by multiplying a default shading estimation coefficient (i.e., an initial shading estimation coefficient) having the weakest correction strength by the block statistical value prior to the shading correction.

According to the present exemplary embodiment, the block statistical values (Rn(N,M), Gn(N,M), and Bn(N,M)) of the R, G, and B values may be expressed as Formula 14 below.

[Formula 14]

$$\left.\begin{array}{l}Rn(N, M) = Ri(N, M) \cdot Nr(N, M) \\ Gn(N, M) = Gi(N, M) \cdot Ng(N, M) \\ Bn(N, M) = Bi(N, M) \cdot Nb(N, M)\end{array}\right\} \quad (14)$$

In Formula 14, Nr, Ng, and Nb are initial shading estimation coefficients of the R, G, and B values, respectively.

In operation S202, the block color evaluation value determination unit 211 may respectively add the block statistical values (Rn(N,M), Gn(N,M), and Bn(N,M)) of the entire blocks to R, G, and B.

In operations S204 to S206, the block color evaluation value determination unit 211 may determine an average gain (AverageGainR) of the R value. In operations S207 to S209, the block color evaluation value determination unit 211 may determine an average gain (AverageGainB) of the B value According to the present exemplary embodiment, the block color evaluation value determination unit 211 may set an average gain of the G value to 1.0 and calculate the average gain (AverageGainR) of the R value and the average gain AverageGainB) of the B value.

In operations S204 to S206, the block color evaluation value determination unit 211 may determine the average gain (AverageGainR) of the R value.

In operation S204, the block color evaluation value determination unit 211 may determine whether the sum of block statistical values (Rn(N,M)) of the R value is 0.

In operation S205, when it is determined in operation S204 that the sum of the block statistical values (Rn(N,M)) of the R value is not 0, the block color evaluation value determination unit 211 may determine that the average gain (AverageGainR) of the R value is (the sum of G values)/(the sum of R values). On the other hand, in order to prevent overflow, the average gain (AverageGainR) of the R value may set an average gain limit (AverageGainLimitR) of the R value as a limit.

In operation S206, when it is determined in operation S204 that the sum of the block statistical values (Rn(N,M)) of the R value is 0, the block color evaluation value determination unit 211 may determine that the average gain (AverageGainR) of the R value is 1.0.

In operations S207 to S209, the block color evaluation value determination unit 211 may determine the average gain (AverageGainB) of the B value.

In operation S207, the block color evaluation value determination unit 211 may determine whether the sum of block statistical values (Bn(N,M)) of the B value is 0.

In operation S208, when it is determined in operation S207 that the sum of the block statistical values (Bn(N,M)) of the B value is not 0, the block color evaluation value determination unit 211 may determine that the average gain (AverageGainB) of the B value is (the sum of G values)/(the sum of B values). On the other hand, in order to prevent overflow, the average gain (AverageGainB) of the B value may set an average gain limit (AverageGainLimitB) of the B value as a limit.

In operation S209, when it is determined in operation S207 that the sum of the block statistical values (Bn(N,M)) of the B value is 0, the block color evaluation value determination unit 211 may determine that the average gain (AverageGainB) of the B value is 1.0.

According to the present exemplary embodiment, the average gain (AverageGainR) of the R value and the average gain (AverageGainB) of the B value may be expressed as Formula 15 below.

[Formula 15]

$$TempGainR = \frac{\sum Gn(N, M)}{\sum Rn(N, M)}$$
$$TempGainB = \frac{\sum Gn(N, M)}{\sum Bn(N, M)}$$
$$AverageGainR = \begin{cases} 1.0 & \text{if } \sum Rn(N, M) = 0 \\ TempGainR & \text{if } TempGainR \leq AverageGainLimitR \\ AverageGainLimitR & \text{if } TempGainR > AverageGainLimitR \end{cases}$$
$$AverageGainB = \begin{cases} 1.0 & \text{if } \sum Bn(N, M) = 0 \\ TempGainB & \text{if } TempGainB \leq AverageGainLimitB \\ AverageGainLimitB & \text{if } TempGainB > AverageGainLimitB \end{cases}$$
(15)

Figure 15A:
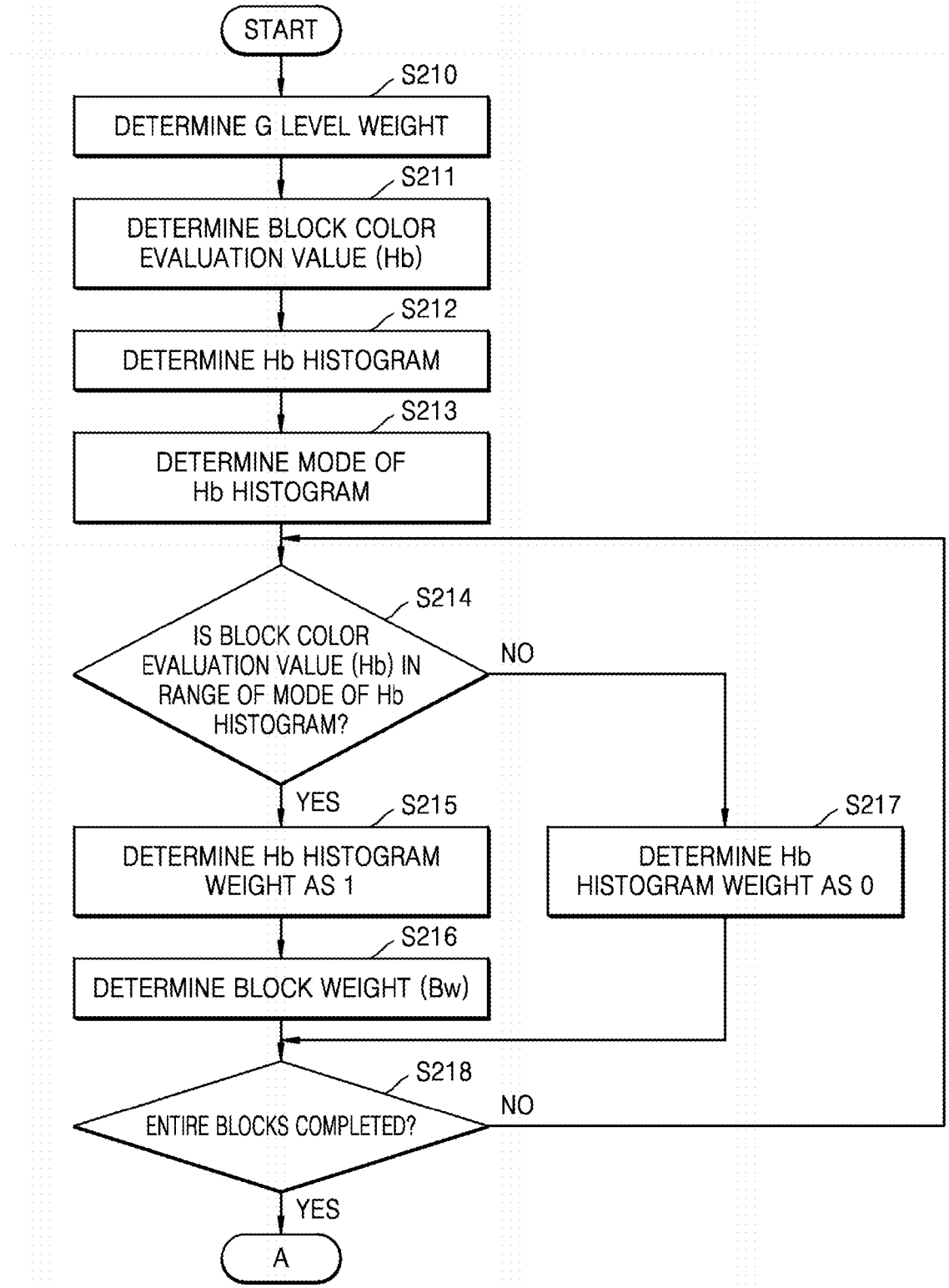
FIGS. 15A and 15B are flowcharts of a method of operating a block color evaluation value determination unit, a block weight coefficient determination unit, and a block evaluation value determination unit, according to an exemplary embodiment.
Figure 15B:
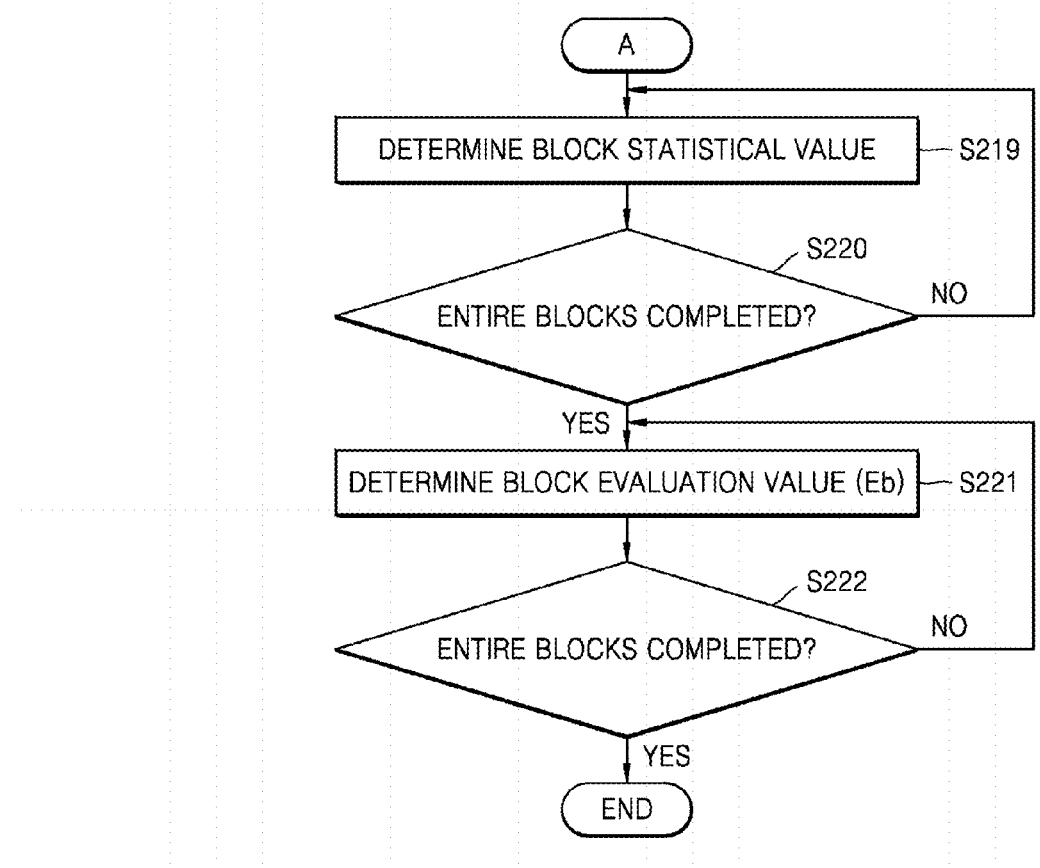

FIGS. 15A and 15B are flowcharts of a method of operating the block color evaluation value determination unit 211, the block weight coefficient determination unit 212, and the block evaluation value determination unit 213, according to an exemplary embodiment.

The shading estimation unit 124 may include the operation of the block color evaluation value determination unit 211 described with reference to FIGS. 15A and 15B. The shading estimation unit 124 may include the operation of the block weight coefficient determination unit 212 described with reference to FIGS. 15A and 15B. In addition, the shading estimation unit 124 may include the operation of the block evaluation value determination unit 213 described with reference to FIGS. 15A and 15B.

In operation S210, the block weight coefficient determination unit 212 may determine a G level weight. According to the present exemplary embodiment, the G level weight may use the block statistical value (Gn(N,M)) of the G value. When the block statistical value (Gn(N,M)) of the G value is in a preset range between a lower limit and an upper limit, the block weight coefficient determination unit 212 may determine that the G level weight of the corresponding block is 1. When the block statistical value (Gn(N,M)) of the G value is out of the preset range, the block weight coefficient determination unit 212 may determine that the G level weight of the corresponding block is 0.

Figure 16:
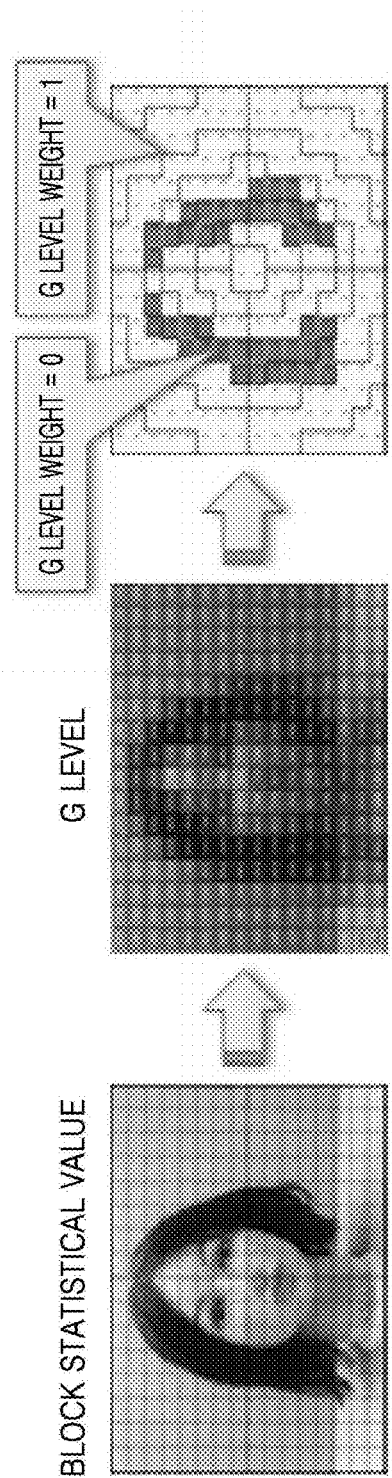
FIG. 16 is a diagram illustrating an example of an image processed by a block weight coefficient determination unit, according to an exemplary embodiment.

FIG. 16 is a diagram illustrating an example of an image processed by the block weight coefficient determination unit 212, according to an exemplary embodiment.

The shading estimation unit 124 may include the operation of the block weight coefficient determination unit 212 described with reference to FIG. 16.

Referring to FIG. 16, the block weight coefficient determination unit 212 may exclude a block adjacent to dark portion or a saturated portion from an evaluation target block. In addition, when one of R, G, and B values of an arbitrary block is out of the preset range, the block weight coefficient determination unit 212 may exclude the corresponding block from the evaluation target block.

In operation S211, the block color evaluation value determination unit 211 may determine a block color evaluation value (Hb(N,M)).

According to the present exemplary embodiment, the block color evaluation value (Hb(N,M)) may be expressed as Formula 16 below. The block color evaluation value (Hb(N,M)) may be calculated with respect to the entire blocks.

[Formula 16]

$$Gng(N, M) = Gn(N, M) \cdot 1.0$$
$$Bng(N, M) = Bn(N, M) \cdot AverageGainB$$
$$Hb(N, M) = Bng(N, M)/Gng(N, M)$$
(16)

Referring to Formula 16, the block color evaluation value (Hb(N,M)) may be determined by multiplying the average value (AverageValueB) of the B value obtained using Formula 15 by the block statistical value (Bn(N,M)) of the B value obtained using Formula 14. The block color evaluation value (Hb(N,M)) may be calculated with respect to the G and B values other than the R value. According to the present exemplary embodiment, assuming that the block statistical value (Bn(N,M)) obtained using Formula 14 is a first block statistical value and a value obtained by multiplying the average gain (AverageGainB) of the B value by the first block statistical value is a second block statistical value (Bng(N,M)), the block color evaluation value (Hb(N,M))

may be determined by using the first block statistical value and the second block statistical value. According to the present exemplary embodiment, the block color evaluation value determination unit 211 may determine the block color evaluation value (Hb(N,M)) by using at least one of a ratio of the second block statistical value with respect to the R value, a ratio of the second block statistical value with respect to the G value, and a ratio of the second block statistical value with respect to the B value. The ratio with respect to the R value may be three times (3R/(R+G+B)) the ratio of R to RGB, or may be a ratio (R/(R+G+B)) of R to RGB.

In operation S212, the block weight coefficient determination unit 212 may determine a histogram of the block color evaluation value (Hb).

In operations S213 to S218, the block weight coefficient determination unit 212 may determine a histogram weight and exclude a block away from a mode.

In operation S213, the block weight coefficient determination unit 212 may determine a histogram mode of the block color evaluation value (Hb).

In operation S214, the block weight coefficient determination unit 212 may determine whether the block color evaluation value (Hb) for each block is in a range of the histogram mode of the block color evaluation value (Hb).

In operation S215, when it is determined in operation S214 that the block color evaluation value (Hb) is in the range of the histogram mode of the block color evaluation value (Hb), the block weight coefficient determination unit 212 may determine that the histogram weight of the block color evaluation value (Hb) is 1.

In operation S216, the block weight coefficient determination unit 212 may determine the block weight (Wb) by multiplying the G level weight by the histogram weight of the block color evaluation value (Hb).

In operation S217, when it is determined in operation S214 that the block color evaluation value (Hb) is out of the range of the histogram mode of the block color evaluation value (Hb), the block weight coefficient determination unit 212 may determine that the histogram weight of the block color evaluation value (Hb) is 0.

Figure 17:
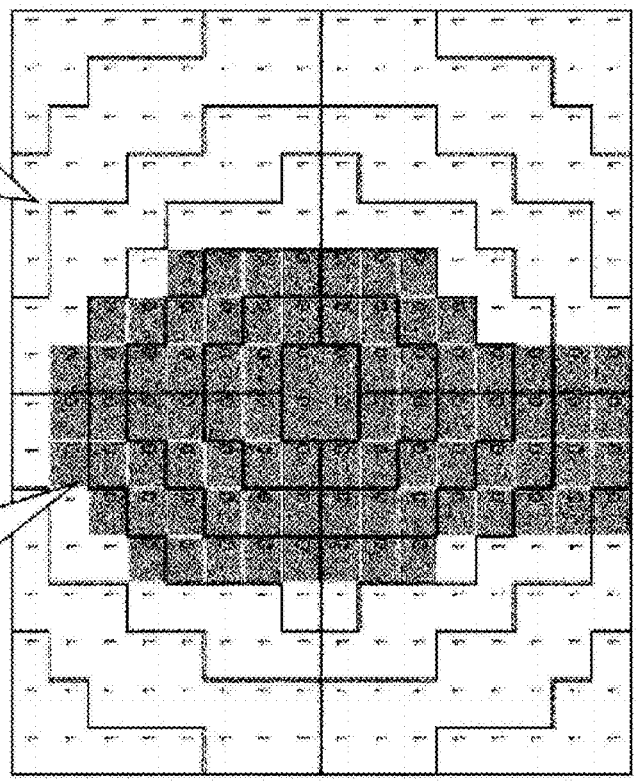
FIG. 17 is a diagram illustrating an example of a histogram generated by a block weight coefficient determination unit, according to an exemplary embodiment.

FIG. 17 is a diagram illustrating an example of the histogram generated by the block weight coefficient determination unit 212, according to an exemplary embodiment.

FIG. 17A is a diagram illustrating an example of the histogram generated by the block weight coefficient determination unit 212. Referring to FIG. 17A, the block color evaluation value (Hb) ranging between 0.65 and 1.35 is divided by intervals of 0.05. FIG. 17B is a diagram illustrating an example in which the operations S215 and S217 are shown on an image.

Figure 18:
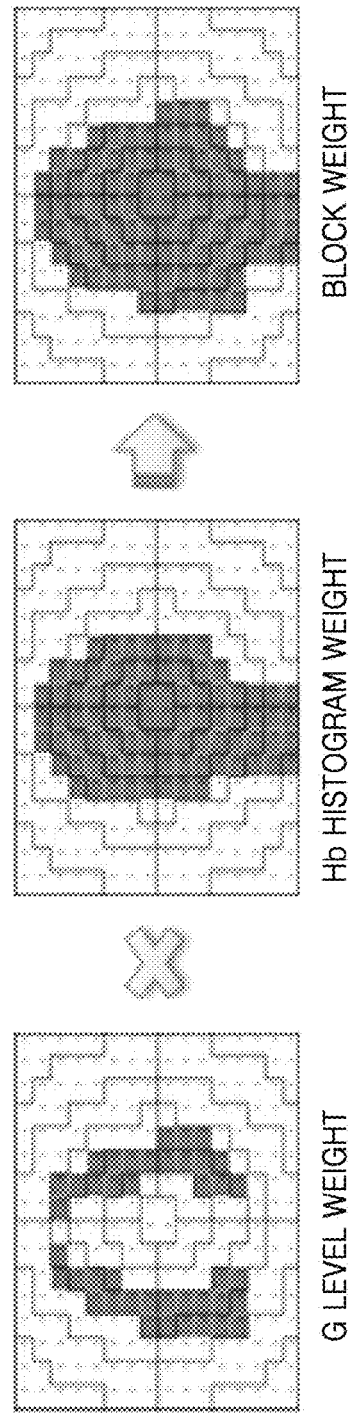
FIG. 18 is a diagram illustrating an example of an image processed by a block weight coefficient determination unit, according to an exemplary embodiment.

FIG. 18 is a diagram illustrating an example of an image processed by the block weight coefficient determination unit 212, according to an exemplary embodiment.

The shading estimation unit 124 may include the operation of the block weight coefficient determination unit 212 described with reference to FIG. 18.

Referring to FIG. 18 and operation S216, the block weight coefficient determination unit 212 may determine the block weight (Wb) by multiplying the G level weight by the histogram weight of the block color evaluation value (Hb).

In operation S219, the block evaluation value determination unit 213 may determine block statistical values (Rc, Gc, and Bc) of R, G, and B values by multiplying the shading estimation coefficient, which is one of shading estimation candidates, by the block statistical values (Ri, Gi, and Bi) of the R, G, and B values prior to the shading correction.

According to the present exemplary embodiment, the block statistical values (Rc, Gc, and Bc) may be expressed as Formula 17 below.

[Formula 17]

$$Rc(N, M) = Ri(N, M) \cdot Cr[t](N, M) \cdot AverageGainR \brace Gc(N, M) = Gi(N, M) \cdot Cg[t](N, M) \cdot 1.0 \quad (17)$$

In Formula 17, Cr[t] and Cg[t] are shading estimation coefficients, which are one of shading estimation candidates, and t is a table number.

In operation S221, the block evaluation value determination unit 213 may determine the block evaluation value (Eb(N,M)) by multiplexing the block weight (Bw(N,M)) by the block statistical values (Rc, Gc, and Bc).

According to the present exemplary embodiment, the block evaluation value (Eb(N,M)) may be expressed as Formula 18 below.

[Formula 18]

$$Eb(N,M)=Bw(N,M) \cdot Rc(N,M)/Gc(N,M) \qquad (18)$$

After the block evaluation values (Eb) of the entire blocks are determined, the shading estimation coefficient determination unit 214 may determine the group evaluation value of the corresponding group by averaging the groups obtained by classifying the image region according to the distance from the center of the image, except for the groups whose block evaluation value (Eb) is 0. A variation in the group evaluation value over the group of the peripheral portion from the group of the central portion may be determined as the evaluation value of the shading estimation coefficient.

Figure 19:
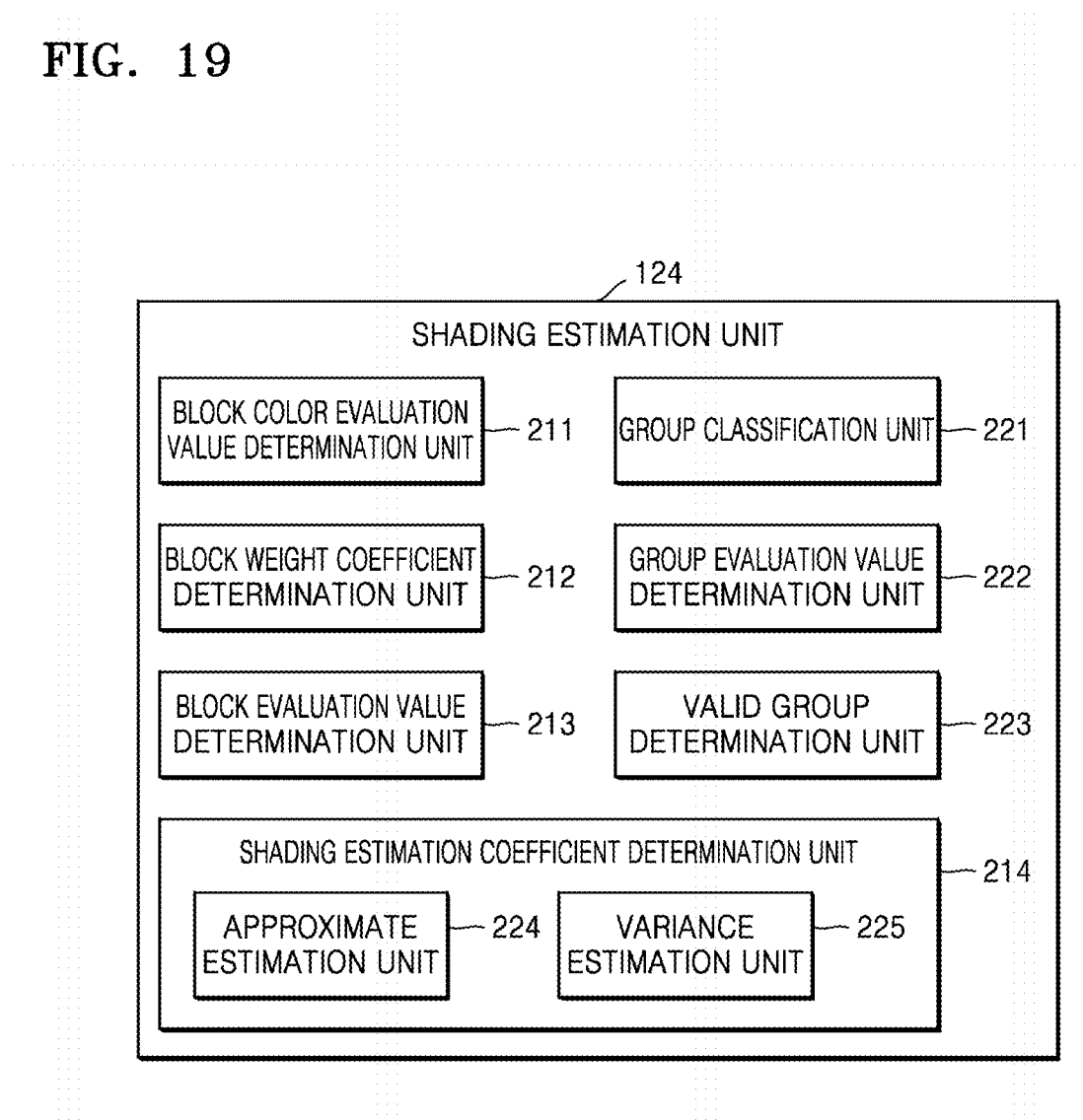
FIG. 19 is a block diagram of a shading estimation unit according to another exemplary embodiment.

FIG. 19 is a block diagram of the shading estimation unit 124 according to another exemplary embodiment.

According to the present exemplary embodiment, the shading estimation unit 124 may include a determination unit that determines the validity of the block with respect to the block statistical value to which the shading estimation coefficient is applied for each light source, determines the validity of the group including a set of blocks, and determines the continuity of the valid group directed from the group of the center of the image toward the peripheral group. The shading estimation unit 124 may make the invalid group valid by interpolation according to the determination result of the group continuity, extract a group of a similar-color subject region, and select a shading correction coefficient suitable for the correction of the captured image according to a slope of an approximate straight line of an R ratio over the peripheral portion from the central portion of the image of the valid group, thus reducing erroneous determination due to the subject.

Referring to FIG. 19, the shading estimation unit 124 may further include a group classification unit 221, a group evaluation value determination unit 222, a valid group determination unit 223, an approximate estimation unit (or an approximate straight line estimation unit), a straight line approximation unit 224, and a variance estimation unit 225, as well as the block color evaluation value determination unit 211, the block weight coefficient determination unit 212, the block evaluation value determination unit 213, and the shading estimation coefficient determination unit 214, which are included in the shading estimation unit 124 of FIG. 13, but is not limited thereto. For example, the shading estimation coefficient determination unit 214 may select the shading estimation coefficient according to the approximation of the approximate estimation unit 224.

The shading estimation unit 124 may include the operation of the group classification unit 221. The shading estimation unit 124 may include the operation of the block evaluation value determination unit 222. In addition, the shading estimation unit 124 may include the operation of the valid group determination unit 223. The shading estimation unit 124 may include the operation of the approximate estimation unit 224. In addition, the shading estimation unit 124 may include the operation of the variance estimation unit 225.

The group classification unit 221 may classify a plurality of blocks, which are obtained by dividing the captured image, into a plurality of groups according to a distance from a central portion of an image. The group evaluation value determination unit 222 may determine the group evaluation value according to the block statistical value. In addition, the group evaluation value determination unit 222 may include a valid block determination unit that determines whether the block is valid or invalid according to the block statistical value, and may determine the group evaluation value according to the sum of the statistical values for each color with respect to the valid block of the group. The valid group determination unit 223 may determine whether the group is valid or invalid according to the group evaluation value or the number of the valid blocks in the group. The approximate estimation unit 224 may determine an approximation formula that approximates the correction by the shading estimation coefficient according to the group evaluation value and select the shading estimation coefficient according to the approximation formula. In addition, the approximate estimation unit 224 may perform straight line approximation on the color (R) ratio with respect to the valid group from the central portion to the peripheral portion of the captured image. The variance estimation unit 225 may determine the sample variance of the block evaluation value and select the shading estimation coefficient that makes the variance value minimum.

According to the present exemplary embodiment, the block color evaluation value determination unit 211, the block weight coefficient determination unit 212, and the block evaluation value determination unit 213 of FIG. 19 may operate in the same manner as the block color evaluation value determination unit 211, the block weight coefficient determination unit 212, and the block evaluation value determination unit 213 of FIG. 13.

Figure 20:
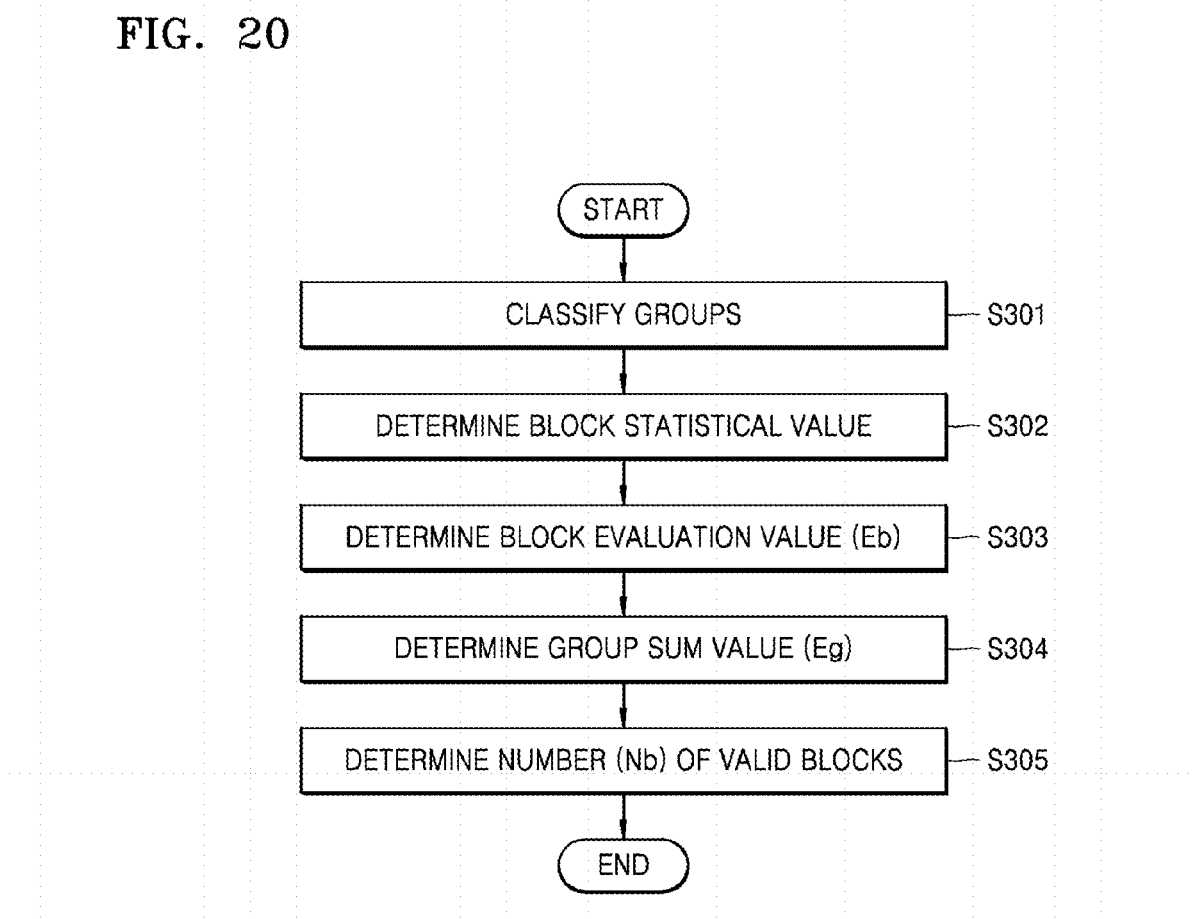
FIG. 20 is a flowchart of a method of operating a group classification unit and a group evaluation value determination unit, according to an exemplary embodiment.

FIG. 20 is a flowchart of a method of operating the group classification unit 221 and the group evaluation value determination unit 222, according to an exemplary embodiment.

The shading estimation unit 124 may include the operation of the group classification unit 221 described with reference to FIG. 20. In addition, the shading estimation unit 124 may include the operation of the group evaluation value determination unit 222 described with reference to FIG. 20.

In operation S301, the group classification unit 221 may divide the plurality of blocks, which are obtained by dividing the captured image, into four quadrants (Q[0] to Q[3]) and classify the plurality of groups into groups G[0] to G[g] according to a distance from the center.

Figure 21:
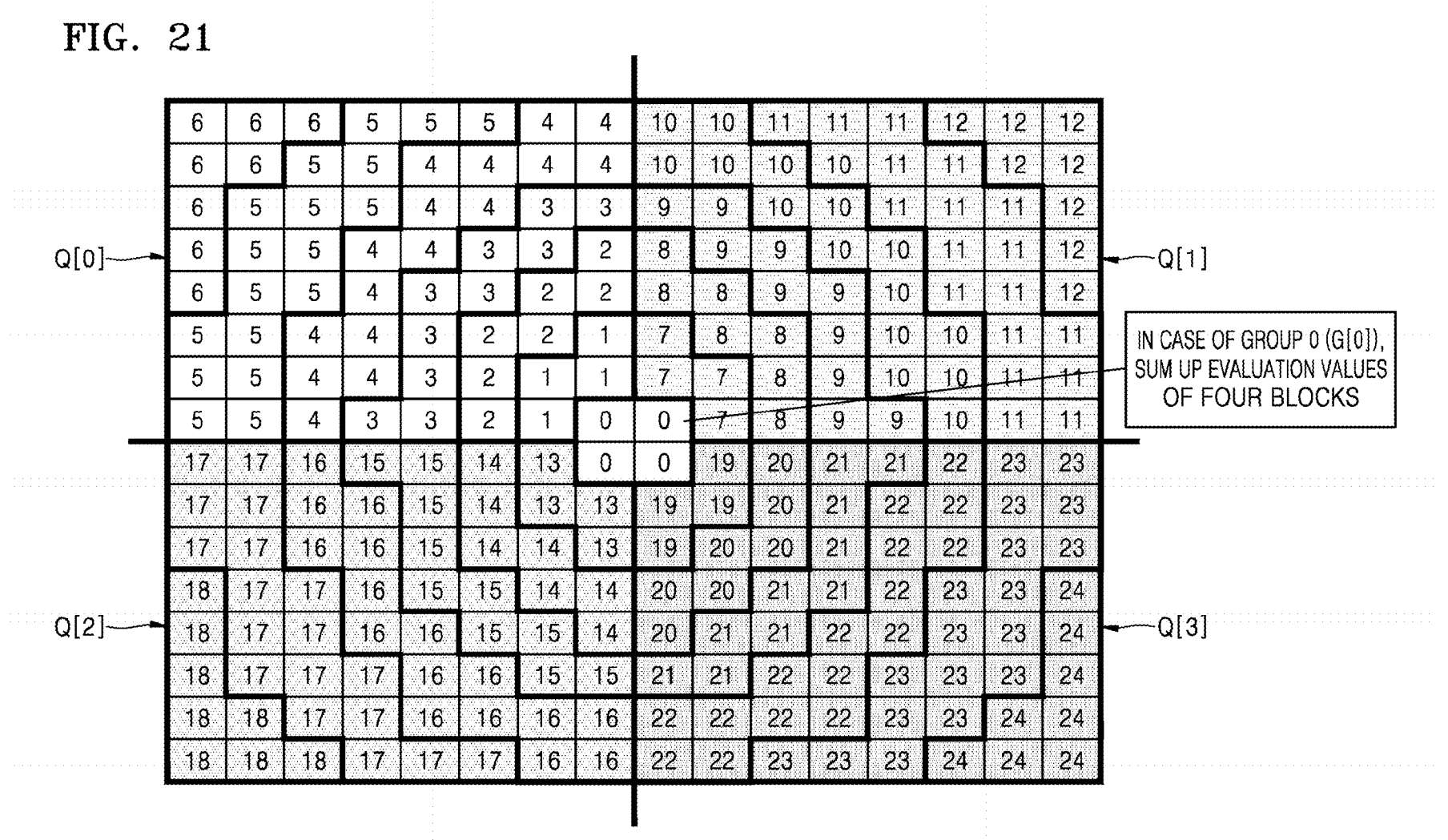

FIG. 21 is a diagram illustrating an example of groups classified by the group classification unit 221, according to an exemplary embodiment. The shading estimation unit 124 may include the operation of the group classification unit 221 described with reference to FIG. 21.

In operation S302, the group evaluation value determination unit 222 may multiply the shading estimation coefficient (small table) of the estimation candidates by block detection data. According to the present exemplary embodiment, the group evaluation value determination unit 222 may determine block statistical values (Rc, Gc, and Bc) of R, G, and B values by multiplying the shading estimation coefficient, which is one of shading estimation candidates, by the block statistical values (Ri, Gi, and Bi) of the R, G, and B values prior to the shading correction.

In operation S303, the group evaluation value determination unit 222 may determine a block evaluation value (Eb). The group evaluation value determination unit 222 may determine the block evaluation value (Eb) by using Formulas 17 and 18.

In operation S304, the group evaluation value determination unit 222 may determine a group sum value (Eg[g]).

According to the present exemplary embodiment, the group sum value (Eg[g]) may be expressed as Formula 19 below.

[Formula 19]

$$Eg[g] = \sum_{N,M \in G[g]} Eb(N, M) \quad (19)$$

According to the present exemplary embodiment, the group evaluation value determination unit 222 may set the sum of the block statistical values of the valid block, which is included in the group, as the group sum value (Eg) among the block statistical values to which the shading estimation coefficient is sequentially applied.

In operation S305, the group evaluation value determination unit 222 may determine the number (Nb[g]) of valid blocks.

According to the present exemplary embodiment, the number (Nb[g]) of valid blocks may be expressed as Formula 20 below.

[Formula 20]

$$Ng[g] = \sum_{N,M \in G[g]} Bw(N, M) \quad (20)$$

Referring to Formula 20, the group evaluation value determination unit 222 may sum up the block weights (Bw(N,M)) for each of the groups (G[0] to G[g]) and determine the number (Nb[g]) of the valid blocks.

The group evaluation value determination unit 222 may perform operations S301 to S305 on the entire candidates of the shading estimation coefficient.

Figure 22A:
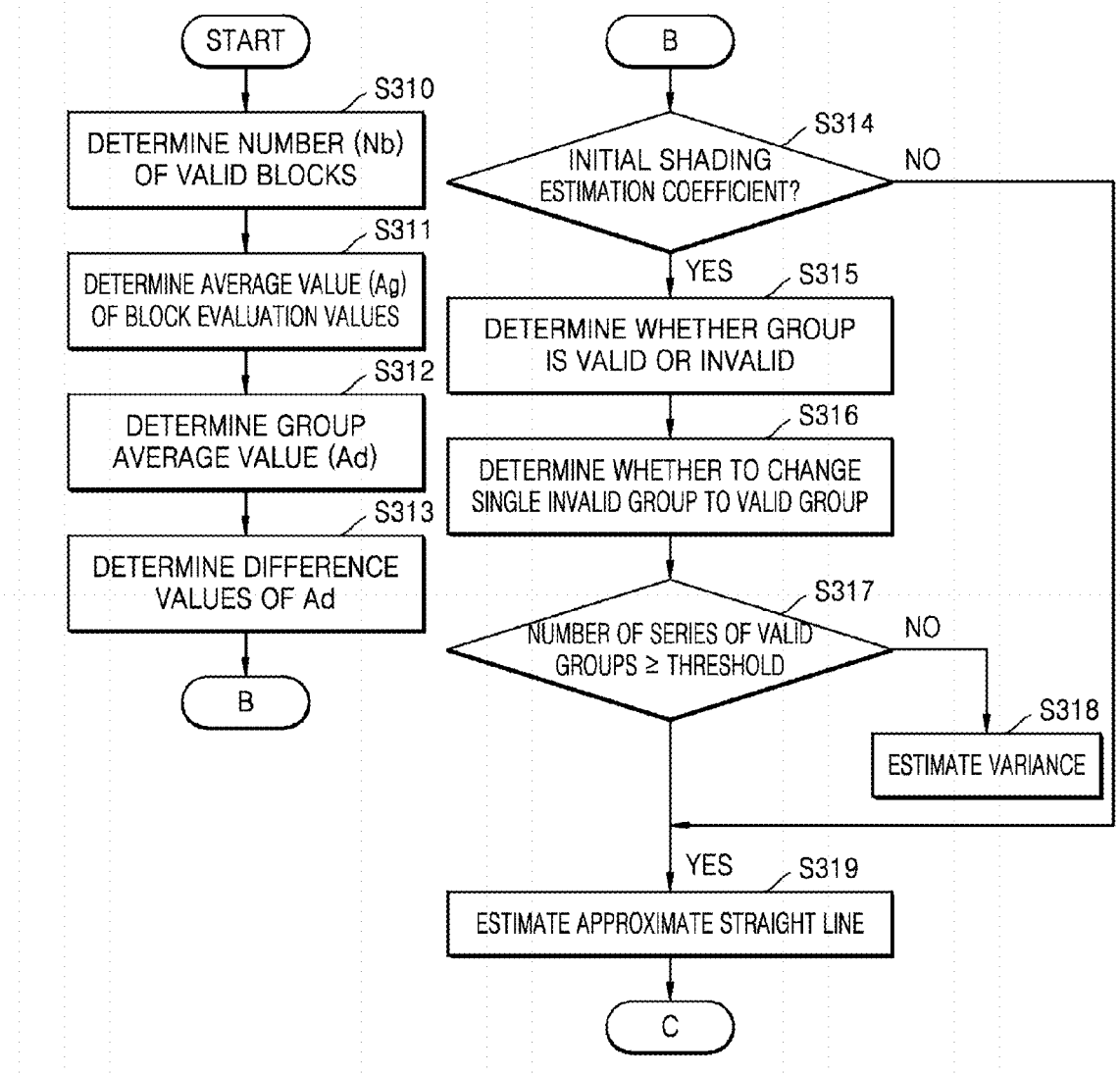
FIGS. 22A and 22B are flowcharts of a method of operating a valid group determination unit and an approximate estimation unit, according to an exemplary embodiment.
Figure 22B:
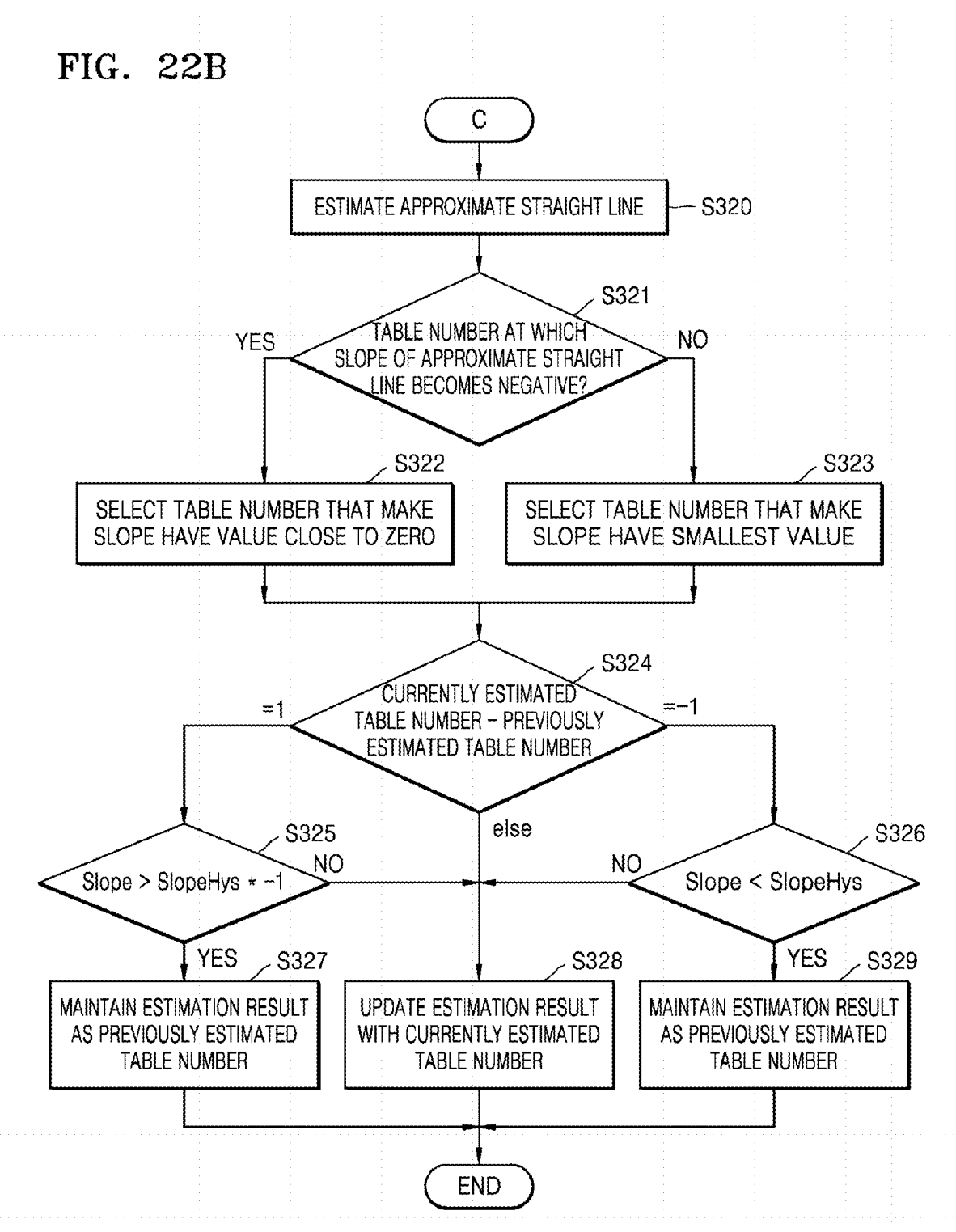

FIGS. 22A and 22B are flowcharts of a method of operating the valid group determination unit 223 and the approximate estimation unit 224, according to an exemplary embodiment.

The shading estimation unit 124 may include the operation of the valid group determination unit 223 described with reference to FIGS. 22A and 22B. In addition, the shading estimation unit 124 may include the operation of the approximate estimation unit 224 described with reference to FIGS. 22A and 22B.

In operation S310, the valid group determination unit 223 may determine the number (Nb[g]) of the valid blocks for each of the groups (G[0] to G[g]). When the number (Nb[g]) of the valid blocks is less than a predetermined threshold (i.e., a valid block number threshold), the valid group determination unit 223 may set the number (Nb[g]) of the valid blocks to 0.

In operation S311, the valid group determination unit 223 may determine an average value (Ag[g]) of the block evaluation values (Eb) for each of the groups (G[0] to G[g]).

According to the present exemplary embodiment, the average value (Ag[g]) of the block evaluation values (Eb) may be expressed as Formula 21 below.

[Formula 21]
$$Ag[g] = \frac{1}{Nb[g]} \cdot Eg[g] \quad (21)$$

When the number (Nb[g]) of the valid blocks is less than the valid block number threshold in the group, the valid group determination unit 223 may set the average value (Ag[g]) of the block evaluation values (Eb) to 0. According to the present exemplary embodiment, when the number (Nb[g]) of the valid blocks is less than the valid block number threshold, the shading estimation unit 124 may exclude the corresponding block from the estimation of the shading estimation coefficient.

In operation S312, the valid group determination unit 223 may determine a group evaluation value (Ad[d]) by averaging the average values (Ag[g]) of the block evaluation values (Eb) for each of the distances (D[0] to D[d]) from the center of the image.

According to the present exemplary embodiment, the group evaluation value (Ad[d]) may be expressed as Formula 22 below.

In case of distance $D[0]$     [Formula 22]
$$Ad[0] = Ag[0]$$

In case of distance $D[1] - [d]$
$$Ad[d] = \sum_{g \in D[d]} Ag[g]/Nd[d]$$

*$Nd[d]$ = number of groups of $Ag[g] > 0$

Figure 23:
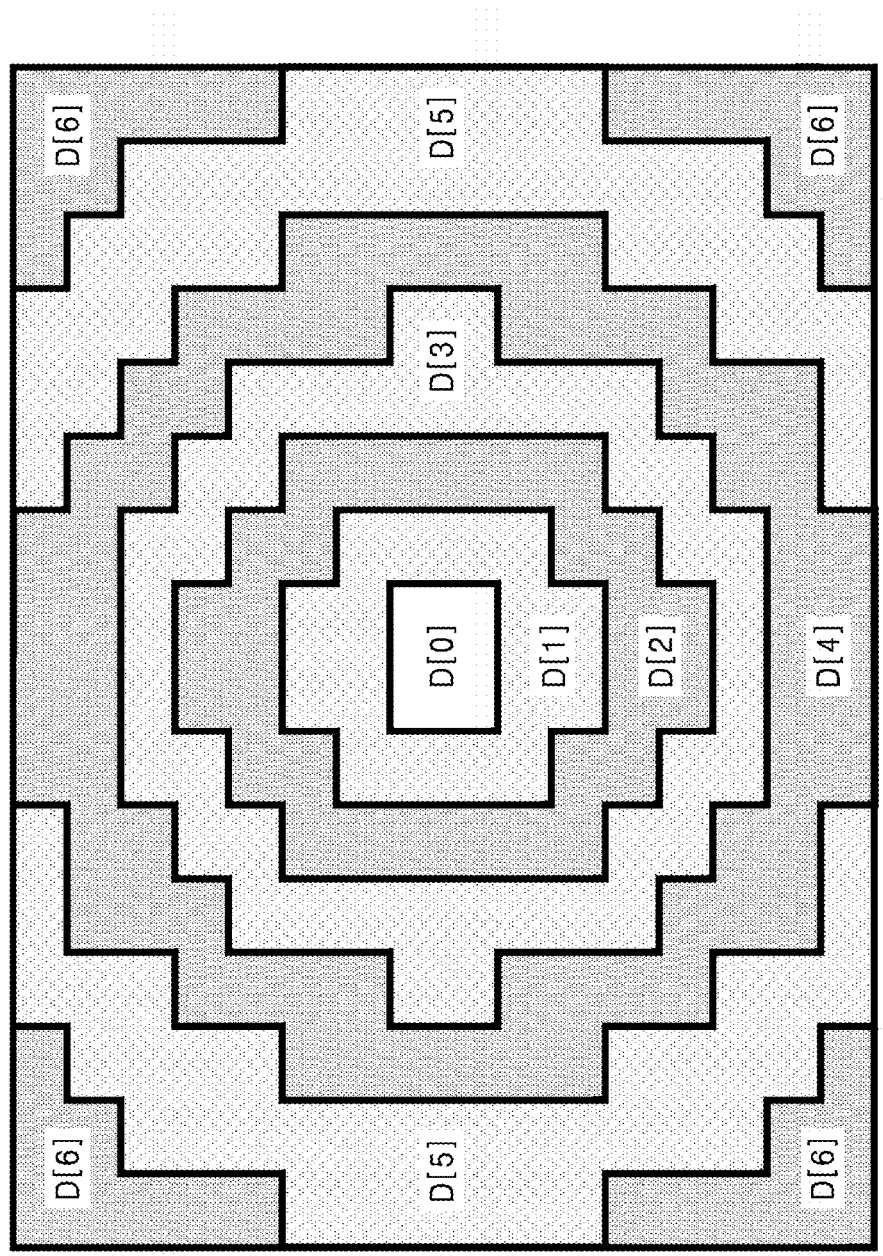
FIG. 23 is a diagram illustrating an example of groups processed by a valid group determination unit, according to an exemplary embodiment.

FIG. 23 is a diagram illustrating an example of groups processed by the valid group determination unit 223, according to an exemplary embodiment.

The shading estimation unit 124 may include the operation of the valid group determination unit 223 described with reference to FIG. 23.

Referring to FIG. 23, an example of groups having distances D[0] to D[6] is illustrated.

In operation S313, the valid group determination unit 223 may calculate a difference value (Diff) of group evaluation values (Ad) from an adjacent group with respect to groups of each distance.

The valid group determination unit 223 may perform operations S310 to S313 on the entire candidates of the shading estimation coefficient.

In operation S314, the valid group determination unit 223 may determine whether the shading estimation coefficient used in operations S310 to S313 is the initial shading estimation coefficient.

In operation S315, when it is determined in operation S314 that the shading estimation coefficient is the initial shading estimation coefficient, the valid group determination unit 223 determines whether the group is valid or invalid for each of the distances (D[0] to D[d]) by using the group evaluation value (Ad[d]) (Ed=1 in the valid case and Ed=0 in the invalid case).

According to the present exemplary embodiment, the group may be determined as invalid when the group evaluation value (Ad[d]) is 0 or the difference value (Diff) of the group evaluation values (Ad) from the adjacent group is greater than a predetermined upper limit or less than a predetermined lower limit.

Figure 24A:
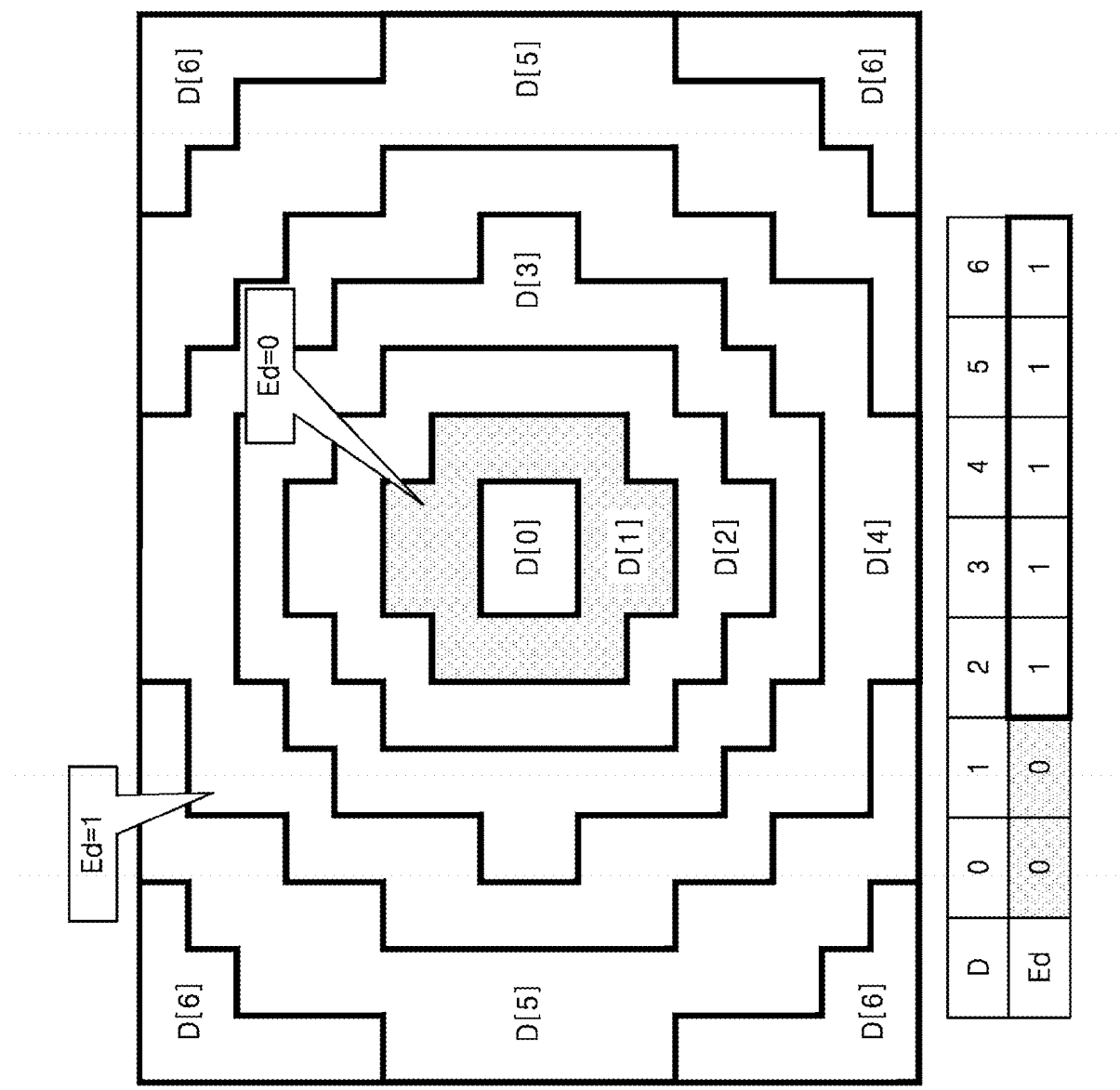
FIG. 24A is a diagram illustrating an example of groups processed by a valid group determination unit, according to an exemplary embodiment.

FIG. 24A is a diagram illustrating an example of groups processed by the valid group determination unit 223, according to an exemplary embodiment. The shading estimation unit 124 may include the operation of the valid group determination unit 223 described with reference to FIG. 24A. Specifically, FIG. 24A illustrates an example in which D[2] to D[6] are valid and D[0] and D[1] are invalid.

Figure 24B:
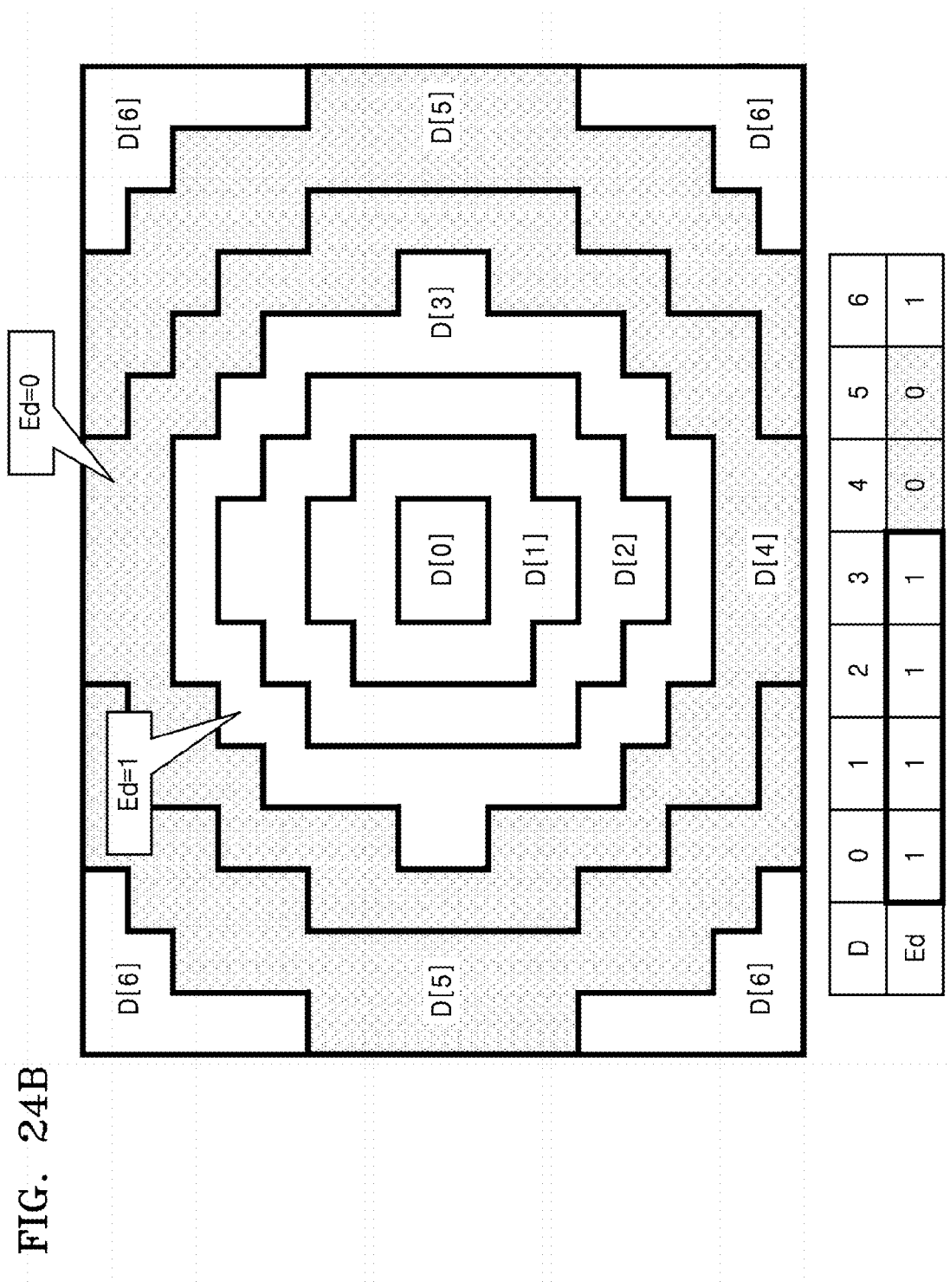
FIG. 24B is a diagram illustrating an example of groups processed by a valid group determination unit, according to another exemplary embodiment.

FIG. 24B is a diagram illustrating an example of groups processed by the valid group determination unit 223, according to another exemplary embodiment. The shading estimation unit 124 may include the operation of the valid group determination unit 223 described with reference to FIG. 24B. Specifically, FIG. 24B illustrates an example in which D[0] to D[3] and D[6] are valid and D[4] and D[5] are invalid.

According to the present exemplary embodiment, the valid group determination unit 223 may include a group continuity determination unit and an invalid-group validation unit. The group continuity determination unit may determine the continuity of the valid groups among the groups directed from the central portion to the peripheral portion of the captured image. The invalid-group validation unit may validate the groups determined as invalid according to the determination result of the group continuity.

In operation S316, when two or more continuous valid groups (i.e., Ed=1) on both sides of a single invalid group (i.e., Ed=0) are present and the difference value (Diff) of the group evaluation values (Ad) between the single invalid group and the valid groups on both sides is equal to or less than a predetermined threshold (i.e., an invalid-distance group interpolation threshold), the valid group determination unit 223 may change the single invalid group to a valid group (that is, Ed=0 is interpolated to 1).

FIG. 25 is a diagram for describing a method of operating the valid group determination unit 223, according to an exemplary embodiment.

The shading estimation unit 124 may include the operation of the valid group determination unit 223 described with reference to FIG. 25.

FIG. 25A illustrates an example in which groups are interpolation targets because the difference value of the group evaluation values (Ad) on both sides of D[2]. FIG. 25B illustrates an example in which groups are not interpolation targets because both sides of D[1] are not continuous. FIG. 25C illustrates an example in which groups are not interpolation targets because D[2] and D[3] are not Ed=0.

In operation S317, the valid group determination unit 223 may determine whether the number of series of valid groups (i.e., an effective distance) (Ne) is equal to or greater than a predetermined threshold (i.e., a valid group series number threshold).

In operation S318, when it is determined in operation S317 that the number (Ne) of series of valid groups is less than the predetermined threshold, the valid group determination unit 223 may determine the shading estimation coefficient determining method as variance estimation. According to the exemplary embodiment, when the number of (Ne)

of series of valid groups is small, it is highly likely that the subject is a complicated subject difficult to estimate. Hence, the valid group determination unit 223 may determine the shading estimation coefficient determining method as variance estimation.

When it is determined in operation S317 that the number (Ne) of series of valid groups is equal to or greater than the predetermined threshold, or when it is determined in operation S314 that the shading estimation coefficient is not the initial shading estimation coefficient, the valid group determination unit 223 may determine the shading estimation coefficient determining method as variance estimation.

The group evaluation value determination unit 222 may perform operations S314 to S319 on the entire candidates of the shading estimation coefficient.

In operation S320, the approximate estimation unit 224 may estimate an approximate straight line for the group evaluation value (Ad) of the valid group by using a least square method with respect to the entire candidates of the shading estimation coefficient. According to the present exemplary embodiment, the effective distance obtained using the initial shading estimation coefficient in operations S315 and S316 may be applied to the entire candidates of the shading estimation coefficient. For example, when the effective distance of the initial shading estimation coefficient is D[2] to D[4], the effective distances of the entire shading estimation coefficients may be set as D[2] to D[4].

In operation S321, the approximate estimation unit 224 may determine whether there is a table number of the shading estimation coefficient at which a slope of the approximate straight line estimated in operation S320 becomes negative.

In operation S322, when it is determined in operation S321 that there is the table number of the shading estimation coefficient at which the slope of the approximate straight line becomes negative, the approximate estimation unit 224 may determine the table number, which makes the slope have a value closest to 0 among the negative slopes, as the table number of the shading estimation coefficient.

In operation S323, when it is determined in operation S321 that there is not the table number of the shading estimation coefficient at which the slope of the approximate straight line becomes negative, the approximate estimation unit 224 may determine the table number, which makes the slope have the smallest value, as the table number of the shading estimation coefficient.

According to the present exemplary embodiment, the approximate estimation unit 224 may select the shading estimation coefficient that makes the approximate straight line be close to a horizon or makes the approximate straight line be closest to a preset reference slope. In addition, when the ratio of the R value is approximated, the approximate estimation unit 224 may use a ratio (R/(R+G+B)) of R to RGB or three times (3R/(R+G+B)) the ratio of R to RGB.

In operation S324, the approximate estimation unit 224 may subtract the previously estimated table number from the currently estimated table number. According to the present exemplary embodiment, the approximate estimation unit 224 may determine whether to update the estimation result by using hysteresis so as to stabilize the estimation result.

In operation S325, when the value obtained in operation S324 by subtracting the previously estimated table number from the currently estimated table number is 1, the approximate estimation unit 224 may determine if Slope (slope)> SlopeHys (slope of hysteresis)×(−1).

In operation S326, when the value obtained in operation S324 by subtracting the previously estimated table number from the currently estimated table number is −1, the approximate estimation unit 224 may determine if Slope<SlopeHys.

In operation S327, when the determination result in operation S325 is Slope>SlopeHys×(−1), the approximate estimation unit 224 may maintain the estimation result as the previously estimated table number.

In operation S328, when the value obtained in operation S324 by subtracting the previously estimated table number from the currently estimated table number is not ±1, or when the determination result in operation S325 is not Slope>SlopeHys×(−1), or when the determination result in operation S326 is not Slope<SlopeHys, the approximate estimation unit 224 may update the estimation result with the currently estimated table number.

In operation S329, when the determination result in operation S326 is Slope<SlopeHys, the approximate estimation unit 224 may maintain the estimation result as the previously estimated table number.

Figure 26:
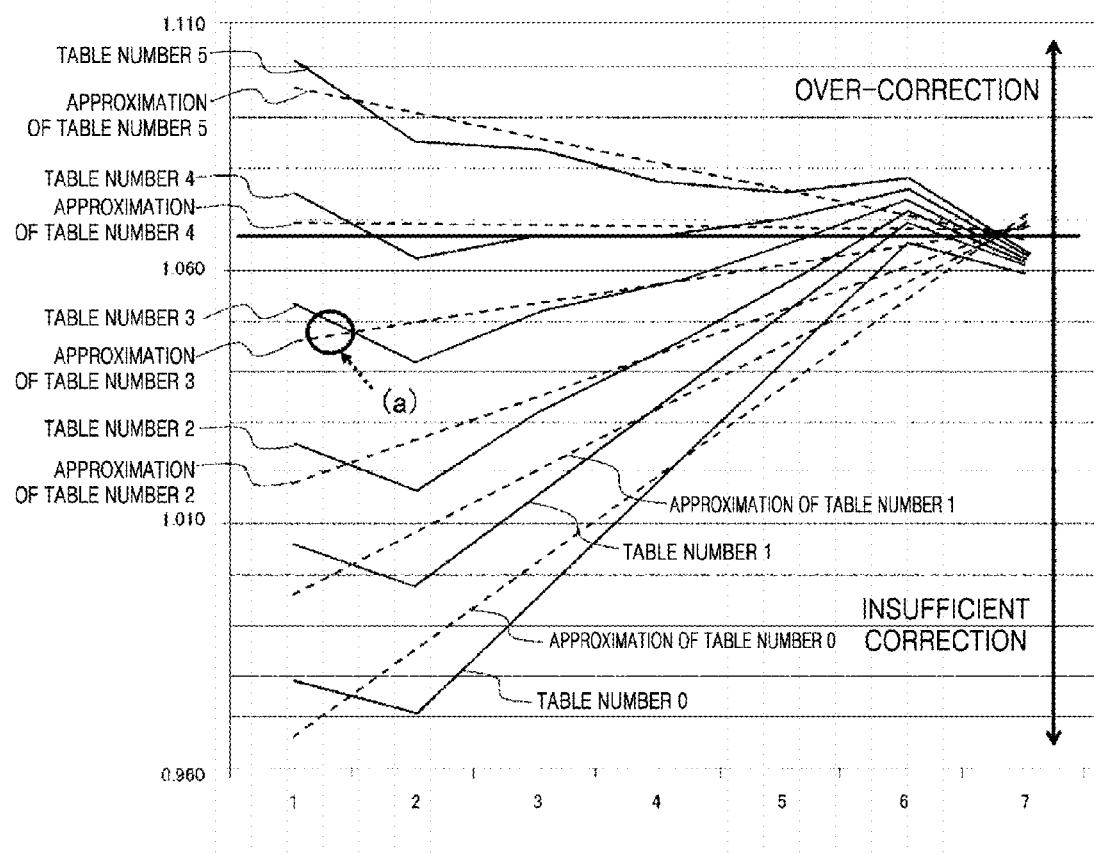
FIG. 26 is a graph showing approximate straight lines processed by an approximate estimation unit, according to an exemplary embodiment.

FIG. 26 is a graph showing approximate straight lines processed by the approximate estimation unit 224, according to an exemplary embodiment.

The shading estimation unit 124 may include the operation of the approximate estimation unit 224 described with reference to FIG. 26.

Referring to FIG. 26, there are approximate straight lines with respect to the entire candidates of the shading estimation coefficient, and the shading estimation coefficient (portion (a)) that is not over-corrected among the corresponding approximate straight lines and makes the correction result be close to a horizon may be set as the estimation result. On the other hand, when the entire approximate straight lines are over-corrected, the shading estimation coefficient that makes the correction degree be weakest may be set as the estimation result.

Figure 27:
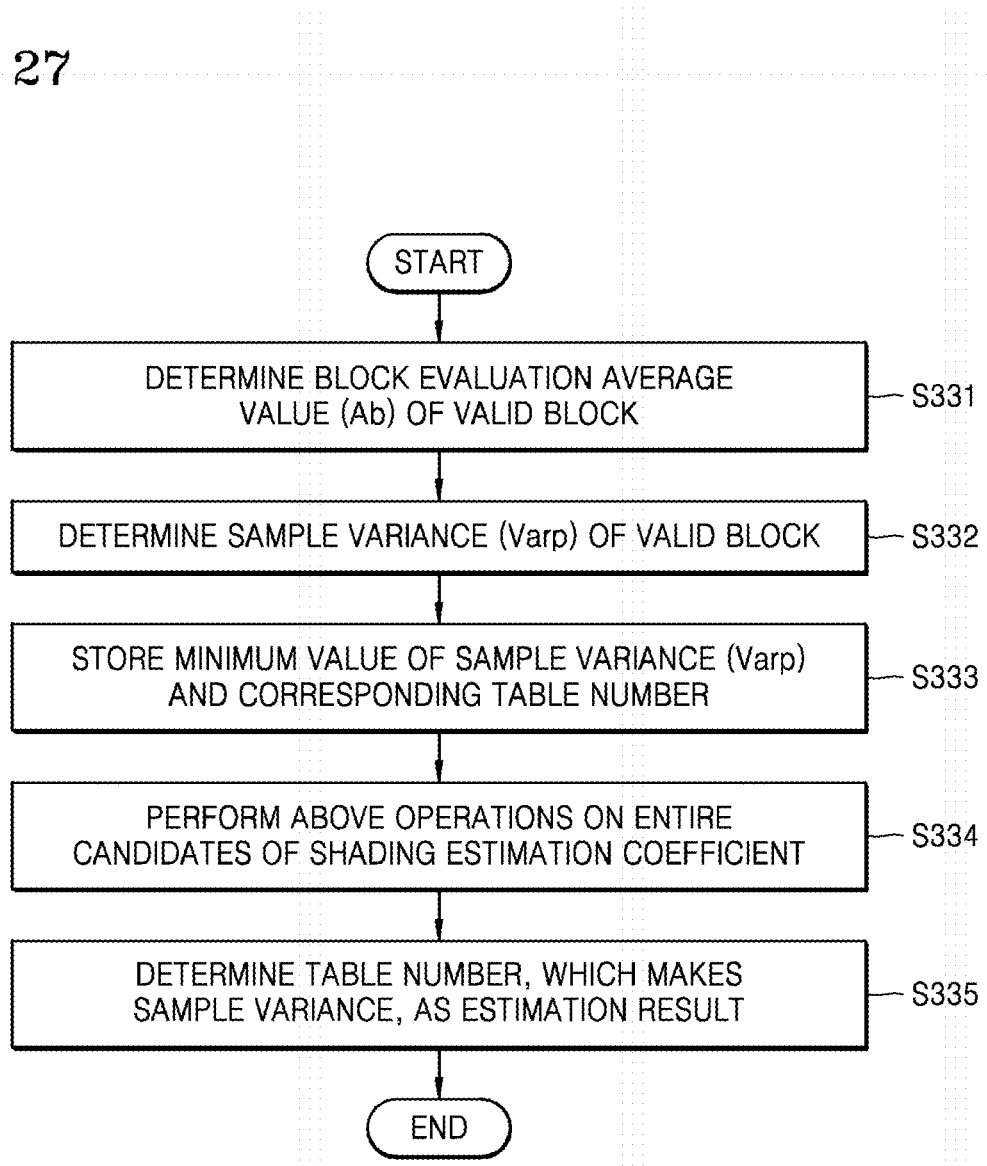
FIG. 27 is a flowchart of a method of operating a variance estimation unit, according to an exemplary embodiment.

FIG. 27 is a flowchart of a method of operating the variance estimation unit 225, according to an exemplary embodiment.

The shading estimation unit 124 may include the operation of the variance estimation unit 225 described with reference to FIG. 27.

In the case of the complicated subject for which approximate straight line estimation is difficult, the variance estimation unit 225 according to the present exemplary embodiment may calculate a sample variance from the block evaluation average value (Ab), which is the average value of the block average values (Eb) of the entire image, and each block evaluation value (Eb) and set the table number (t), which makes a variance value be minimum, as the estimation result.

In operation S331, the variance estimation unit 225 may determine the block evaluation average value (Ab) of the valid block.

According to the present exemplary embodiment, the block evaluation average value (Ab) of the valid block may be expressed as Formula 23 below.

[Formula 23]

$$\left. \begin{array}{l} Nb = \sum_{N,M} Bw(N, M) \\ Ab = \frac{1}{Nb} \sum_{N,M}^{Nb} Eb(N, M) \end{array} \right\} \quad (23)$$

In Formula 23, Nb is the number of valid blocks (block weight (Bw)=1).

In operation S332, the sample variance (Varp) of the valid block may be determined.

In operation S333, a minimum value of the sample variance (Varp) of the valid block and a corresponding table number (t) may be stored.

According to the present exemplary embodiment, the sample variance (Varp) of the valid block may be expressed as Formula 24 below.

[Formula 24]

$$Varp = \frac{1}{Nb} \sum_{N,M}^{Nb} (Eb(N, M) - Ab)^2 \quad (24)$$

In operation S334, the variance estimation unit 225 may determine whether operations S331 to S333 have been performed on the entire candidates of the shading estimation coefficient.

In operation S335, the variance estimation unit 225 may determine the table number (t), which makes the sample variance (Varp) of the valid block be minimum, as the estimation result.

According to the present exemplary embodiment, the estimation result in operation S335 may be expressed as Formula 25 below.

[Formula 25]

$$\text{result} = \min\{Varp[t_0], \ldots, Varp[t_n]\} \quad (25)$$

According to another exemplary embodiment, the shading estimation unit 124 may classify the blocks into groups according to a distance from a central block of an image, with respect to the block images to which the candidates of the shading estimation coefficient are applied, and determines whether the group is a group to be used for estimation. A color (R) ratio of groups adjacent to the image from the central group of the image may be straight-line approximated. Shading correction tables respectively corresponding to the shading estimation coefficients may be selected according to the slop of the approximate straight line with respect to shading estimation tables respectively corresponding to a plurality of light sources. Since the shading estimation unit 124 according to another exemplary embodiment determines the table evaluation value by evaluating the continuity of the change in the color (R) ratio from the central portion to the peripheral portion of the image, it is possible to reduce the shading estimation error by excluding the change in the color (R) ratio due to the subject color.

Figure 28:
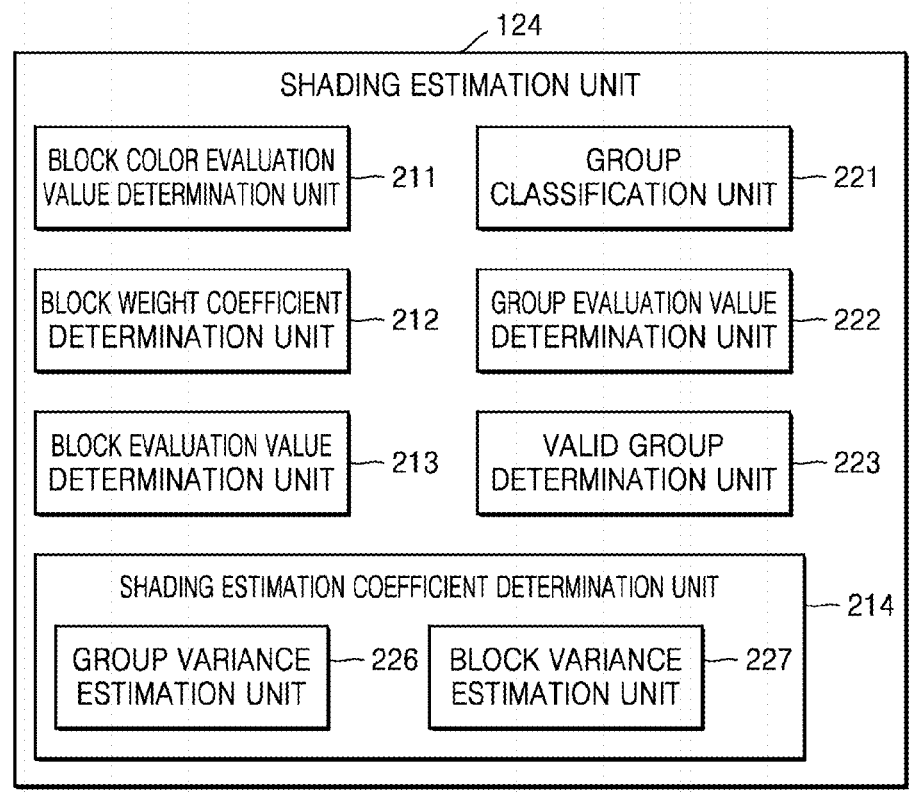
FIG. 28 is a block diagram of a shading estimation unit according to another exemplary embodiment.

FIG. 28 is a block diagram of the shading estimation unit 124 according to another exemplary embodiment.

According to the present exemplary embodiment, the shading estimation unit 124 may increase the number of valid groups, that is, the number of evaluation target groups, by changing the method of determining the valid group, calculate the variance for each continuous valid group, and set the sum of the calculated variances as the evaluation value of the shading estimation coefficient.

Referring to FIG. 28, the shading estimation unit 124 may include a group variance estimation unit 226 and a block variance estimation unit 227, instead of the approximate estimation unit 224 and the variance estimation unit 225 included in the shading estimation unit 124 of FIG. 19, but is not limited thereto. The shading estimation unit 124 may estimate the shading according to any one of the group variance and the block variance.

The shading estimation unit 124 may include the operation of the group variance estimation unit 226.

According to the present exemplary embodiment, the group variance estimation unit 226 may calculate variance values of group evaluation values (Ad[d]) for each continuous valid group (i.e., group continuous region), sets the sum of the variance values as the evaluation value of the shading estimation coefficient, and determine a shading estimation coefficient that makes the evaluation value be smallest.

The shading estimation unit 124 may include the operation of the block variance estimation unit 227. In addition, the shading estimation unit 124 may include the operation of the group variance estimation unit 226.

According to the present exemplary embodiment, when the number of group continuous regions is less than a predetermined threshold, the block variance estimation unit 227 may perform valid block variance estimation processing instead of the processing of the group variance estimation unit 226.

Figure 29:
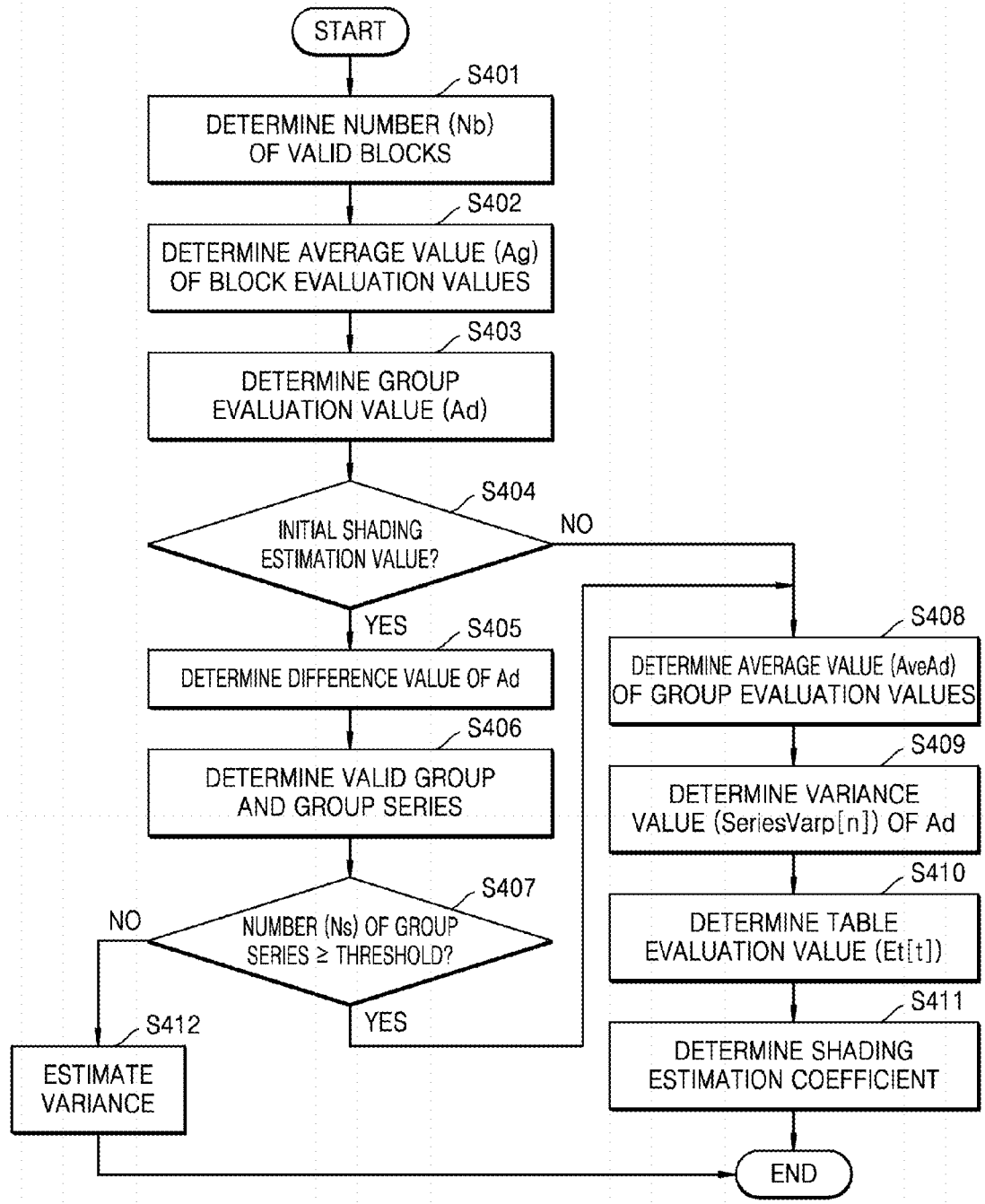
FIG. 29 is a flowchart of a method of operating a shading estimation unit, according to another exemplary embodiment.

FIG. 29 is a flowchart of a method of operating the shading estimation unit 24, according to another exemplary embodiment.

The shading estimation unit 124 may include the operation of the valid group determination unit 223 described with reference to FIG. 29.

According to the present exemplary embodiment, the block color evaluation value determination unit 211, the block weight coefficient determination unit 212, the block evaluation value determination unit 213, the group classification unit 221, the group evaluation value determination unit 222, and the valid group determination unit 223 of FIG. 29 may operate in the same manner as the block color evaluation value determination unit 211, the block weight coefficient determination unit 212, the block evaluation value determination unit 213, the group classification unit 221, the group evaluation value determination unit 222, and the valid group determination unit 223 of FIG. 19.

In operation S410, the valid group determination unit 223 may determine the number (Nb[g]) of the valid blocks for each of the groups (G[0] to G[g]). When the number (Nb[g]) of the valid blocks is less than a predetermined threshold (i.e., a valid block number threshold), the valid group determination unit 223 may set the number (Nb[g]) of the valid blocks to 0. According to the present exemplary embodiment, operation S401 may be substantially the same as operation S310.

In operation S402, the valid group determination unit 223 may determine an average value (Ag[g]) of the block evaluation values (Eb) for each of the groups (G[0] to G[g]). According to the present exemplary embodiment, operation S402 may be substantially the same as operation S311.

According to the present exemplary embodiment, the average value (Ag[g]) of the block evaluation values (Eb) may be calculated by using Formula 21 of operation S311. When the number (Nb[g]) of the valid blocks is 0, the valid group determination unit 223 may set the average value (Ag[g]) of the block evaluation values (Eb) to 0. That is, when the number of the valid blocks in the group is small, the valid group determination unit 223 may determine the corresponding groups as invalid.

In operation S403, the valid group determination unit 223 may determine a group evaluation value (Ad[d]) by averaging the average values (Ag[g]) of the block evaluation values (Eb) for each of the distances (D[0] to D[d]) from the center of the image. According to the present exemplary embodiment, operation S403 may be substantially the same as operation S312.

According to the present exemplary embodiment, the group evaluation value (Ad[d]) may be calculated by using Formula 22 of operation S312.

The valid group determination unit 223 may perform operations S401 to S403 on the entire candidates of the shading estimation coefficient.

In operation S404, the valid group determination unit 223 may determine whether the shading estimation coefficient used in operations S401 to S403 is the initial shading estimation coefficient.

In operation S405, when it is determined in operation S404 that the shading estimation coefficient is the initial shading estimation coefficient, the valid group determination unit 223 may calculate a difference value (Diff) of group evaluation values (Ad) from an adjacent group with respect to groups of each distance.

In operation S406, the valid group determination unit 223 may determine the valid group and the group continuous region.

FIG. 30 is a diagram for describing a method of determining a valid group, according to an exemplary embodiment.

The shading estimation unit 124 may include the operation of the valid group determination unit 223 described with reference to FIG. 30.

In FIGS. 30A and 30B, horizontal directions represent a case where an image is divided into seven groups of distances D[0] to D[6], and vertical directions represent group evaluation values (Ad[d]) for each of the distances D[0] to D[6].

According to the present exemplary embodiment, when the difference value (Diff) between the group evaluation value (Ad[d]) of the current group and the group evaluation values (Ad[d]) of groups on both sides of the current group is greater than a predetermined threshold (i.e., an adjacent group difference determination threshold), the valid group determination unit 223 may determine the current group as the invalid group.

Referring to FIG. 30A, the group evaluation value (Ad[d]) of D[0] to D[2] and the group evaluation value (Ad[d]) of D[3] to D[6] are substantially constant, and a difference between these distances is substantially 0. In addition, the difference value between D[2] and D[3] may be greater than the adjacent group difference determination threshold. In this case, the valid group determination unit 223 may determine each group of D[0] to D[6] as the valid group.

Referring to FIG. 30B, the group evaluation value (Ad[d]) of D[0] to D[2] and the group evaluation value (Ad[d]) of D[4] to D[6] are substantially constant, and a difference between these distances is substantially 0. In addition, the difference value between D[2] and D[3] and the difference value between D[3] and D[4] may be greater than the adjacent group difference determination threshold. In this case, the valid group determination unit 223 may determine each group of D[0] to D[2] and D[4] to D[6] as the valid group and may determine the group of D[3] as the invalid group.

According to the present exemplary embodiment, in the case of the group, such as D[0] or D[6], in which only one adjacent group is present, it is possible to determine whether the group is the valid group by comparing the difference value (Diff) of the group evaluation value (Ad[d]) from the corresponding adjacent group with the adjacent group difference determination threshold.

Figure 31:
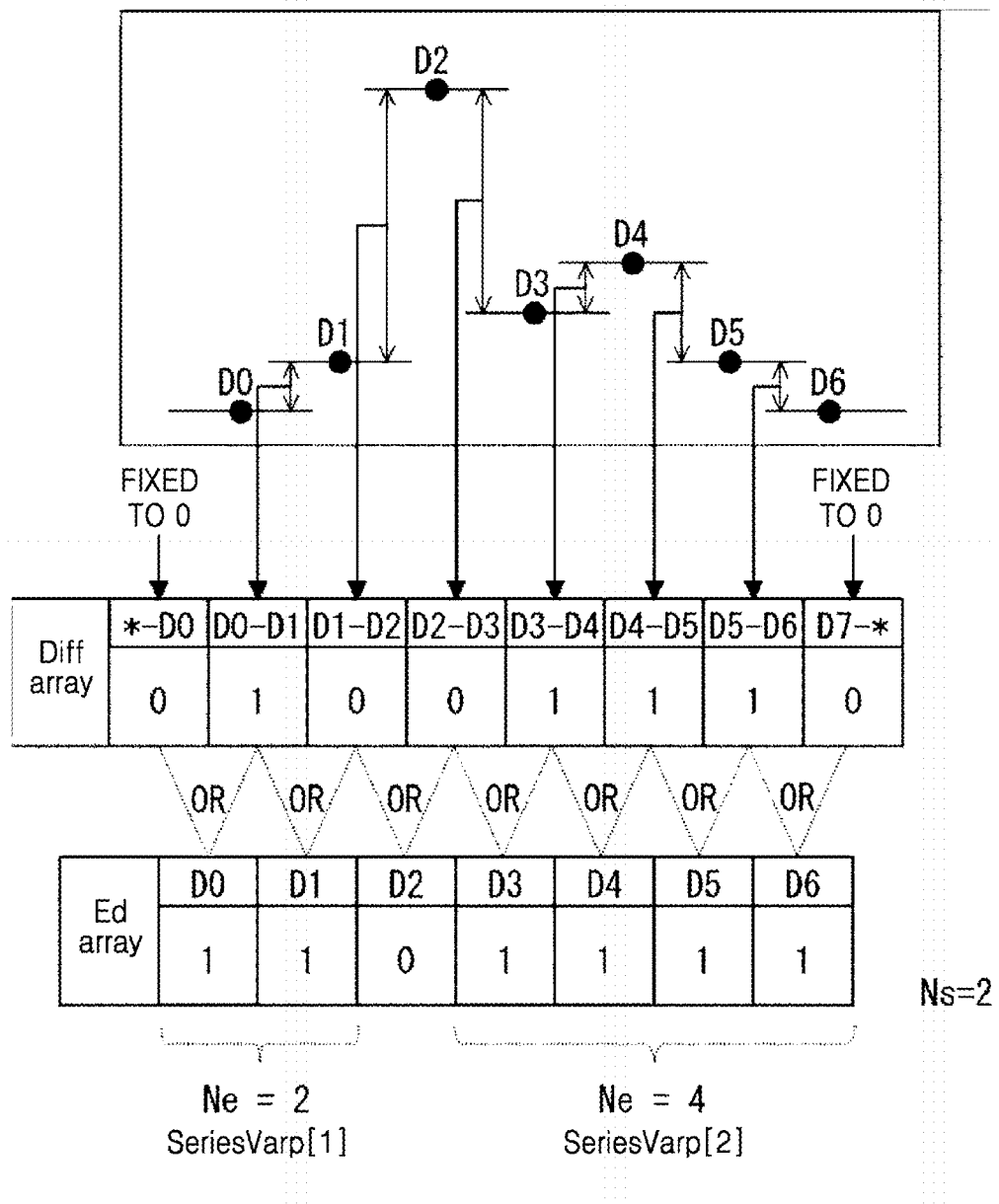
FIG. 31 is a diagram for describing a method of determining a valid group, according to another exemplary embodiment.

FIG. 31 is a diagram for describing a method of determining a valid group, according to another exemplary embodiment.

The shading estimation unit 124 may include the operation of the valid group determination unit 223 described with reference to FIG. 31.

Referring to FIG. 31, as in FIGS. 30A and 30B, a horizontal direction represents a case where an image is divided into seven groups of distances D[0] to D[6], and a vertical direction represents a group evaluation value (Ad[d]) for each of the distances D[0] to D[6].

A Diff array may store 0 or 1 according to a difference value (Diff) between a group evaluation value (Ad[d]) of a current group and a group evaluation value (Ad[d]) of an adjacent group. According to the present exemplary embodiment, in the Diff array, a section in which the difference value (Diff) between the group evaluation value (Ad[d]) of the current group and the group evaluation value (Ad[d]) of the adjacent group is equal to or greater than the adjacent group difference determination threshold may be set as 0, a section in which the difference value (Diff) between the group evaluation value (Ad[d]) of the current group and the group evaluation value (Ad[d]) of the adjacent group is less than the adjacent group difference determination threshold may be set as 1, and these values are stored. At this time, the Diff array may have a length of (the number of adjacent groups)+1, and start and end components of the Diff array may be 0.

An Ed array may determine the validity of each group. According to the present exemplary embodiment, the Ed array may store 1 when at least one of adjacent components of the Diff array is 1. When 1 is successive twice or more times in the Ed array, that is, when two or more valid groups are successive, the valid group determination unit 223 may determine it as a group series.

Referring to FIG. 31, the Diff array may store 0 in (*-D0), (D1-D2), (D2-D3), and (D7-*) components. The Ed array may store 0 in a D2 component. Therefore, the valid group determination unit 223 may determine D[2] as the invalid group and may determine D[0], D[1] and D[3] to D[6] as the valid groups. On the other hand, the valid group determination unit 223 may determine D[0], D[1] and D[3] to D[6] as the group series.

In operation S407, the valid group determination unit 223 may determine whether the number (Ns) of group series is equal to or greater than a predetermined threshold (i.e., a series threshold).

Referring to FIG. 31, the number (Ns) of the group series is 2.

In operation S408, when it is determined in operation S407 that the number (Ns) of the group series is equal to or greater than the series threshold, or when it is determined in operation S404 that the shading estimation coefficient is not the initial shading estimation coefficient, the group variance estimation unit 226 may determine the average value (AveAd) of the group evaluation values (Ad[d]).

According to the present exemplary embodiment, the average value (AveAd) of the group evaluation values (Ad[d]) may be expressed as Formula 26 below.

[Formula 26]

$$AveAd = \frac{1}{Ne} \sum_{d=0}^{Ne} Ad(d) \qquad (26)$$

In Formula 26, Ne is the number of groups in the group series. According to the present exemplary embodiment, when the variance value according to the initial shading estimation coefficient or the variance value according to the shading estimation coefficients other the initial shading estimation coefficient is calculated, the group series obtained in operations S405 and S406 may be commonly used.

In operation S409, the group variance estimation unit 226 may determine a variance value (SeriesVarp[n]) of the group evaluation values (Ad[d]).

According to the present exemplary embodiment, the variance value (SeriesVarp[n]) of the group evaluation values (Ad) may be expressed as Formula 27 below.

[Formula 27]

$$SeriesVarp[n] = \frac{1}{Ne}\sum_{d=0}^{Ne}(Ad(d)-AveAd)^2 \qquad (27)$$

In operation S410, the group variance estimation unit 226 may determine a table evaluation value (Et[t]).

According to the present exemplary embodiment, the table evaluation value (Et[t]) may be expressed as Formula 28 below.

[Formula 28]

$$Et[t] = \sum_{d=0}^{Ns}(SeriesVarp(n)) \qquad (28)$$

The group variance estimation unit 226 may perform operations S408 to S410 on the entire candidates of the shading estimation coefficient.

In operation S411, the group variance estimation unit 226 may determine a shading estimation coefficient that makes the table evaluation value (Et[t]) be smallest among the entire shading estimation coefficients.

According to the present exemplary embodiment, the shading estimation coefficient in operation S411 may be expressed as Formula 29 below.

[Formula 29]

$$result=min\{Et[t_0] \ldots ,Et[t_n]\} \qquad (29)$$

In operation S412, when it is determined in operation S407 that the number (Ns) of the group series is less than the series threshold, the block variance estimation unit 227 may determine the estimation method as the variance estimation. According to the present exemplary embodiment, the operation of the block variance estimation unit 227 may be substantially the same as the operation of the variance estimation unit 225 of FIG. 27.

The exemplary embodiments set forth herein may be embodied as program instructions that can be executed by various computing units and recorded on a non-transitory computer-readable recording medium. Examples of the non-transitory computer-readable recording medium may include program instructions, data files, and data structures solely or in combination. The program instructions recorded on the non-transitory computer-readable recording medium may be specifically designed and configured for the inventive concept, or may be well known to and usable by one of ordinary skill in the field of computer software. Examples of the non-transitory computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device specially configured to store and execute program instructions (e.g., a ROM, a random access memory (RAM), a flash memory, etc.). Examples of the program instructions may include not only machine language codes prepared by a compiler but also high-level codes executable by a computer by using an interpreter.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image processing apparatus comprising:
a processor configured to act as:
an input unit configured to receive a captured image; and
a data processing unit configured to determine block statistics which indicates image characteristics of each of a plurality of blocks by using the plurality of blocks obtained by dividing the captured image, determine a shading estimation coefficient by using the determined block statistics and an amount of infrared light included in a light source, and correct shading of the captured image by using the determined shading estimation coefficient.

2. The image processing apparatus of claim 1, wherein the data processing unit determines the shading estimation coefficient by using at least one of luminance of the captured image, a color temperature of the light source, and flatness of the captured image.

3. The image processing apparatus of claim 2, wherein the data processing unit determines the flatness of the captured image by summing up differences of characteristic values of blocks continuous from a peripheral portion to a central portion of the captured image.

4. The image processing apparatus of claim 1, wherein the data processing unit determines a block color evaluation value by using the determined block statistics, determines a block weight by using the determined block color evaluation value, determines a block evaluation value by using the determined block statistics and the determined block weight, and determines the shading estimation coefficient by using the determined block evaluation value.

5. The image processing apparatus of claim 4, wherein the data processing unit determines a histogram weight by using the determined block color evaluation value and determines the block weight by using the histogram weight and a G level weight.

6. The image processing apparatus of claim 4, wherein the data processing unit classifies the plurality of blocks into a plurality of groups, determines the group evaluation value by using the determined block statistics and the classified groups, determines a valid group by using the determined block statistics and the determined group evaluation value, and determines the shading estimation coefficient by using the determined valid group.

7. The image processing apparatus of claim 6, wherein the data processing unit determines the group evaluation value by averaging average values of the determined block evaluation values for each distance from a center of the captured image.

8. The image processing apparatus of claim 6, wherein the data processing unit estimates an approximate straight line by using the determined group evaluation value, determines the shading estimation coefficient by using the estimated approximate straight line, estimates a sample variance by using the determined block evaluation value, and determines the shading estimation coefficient by using the estimated sample variance.

9. The image processing apparatus of claim 8, wherein when slopes of the estimated approximate straight line are negative, the data processing unit determines the shading estimation coefficient that makes the estimated approximate straight line have a slope closest to zero among the negative slopes, and
when the slopes of the estimated approximate straight line are nonzero, the data processing unit determines the shading estimation coefficient that makes the estimated approximate straight line have a smallest slope among the nonzero slopes.

10. The image processing apparatus of claim 6, wherein the data processing unit estimates a variance by using the determined group evaluation value, determines the shading estimation coefficient by using the estimated variance, estimates a sample variance by using the determined block evaluation value, and determines the shading estimation coefficient by using the estimated sample variance.

11. An image processing method comprising:
receiving a captured image;
determining block statistics which indicates image characteristics of each of a plurality of blocks by using the plurality of blocks obtained by dividing the captured image;
determining a shading estimation coefficient by using the determined block statistics and an amount of infrared light included in a light source; and
correcting shading of the captured image by using the determined shading estimation coefficient.

12. The image processing method of claim 11, wherein the determining of the shading estimation coefficient comprises determining the shading estimation coefficient by using at least one of luminance of the captured image, a color temperature of the light source, and flatness of the captured image.

13. The image processing method of claim 12, wherein the flatness of the captured image is determined by summing up differences of characteristic values of blocks continuous from a peripheral portion to a central portion of the captured image.

14. The image processing method of claim 11, wherein the determining of the shading estimation coefficient comprises:
determining a block color evaluation value by using the determined block statistics;
determining a block weight by using the determined block color evaluation value;
determining a block evaluation value by using the determined block statistics and the determined block weight; and
determining the shading estimation coefficient by using the determined block evaluation value.

15. The image processing method of claim 14, wherein the determining of the block weight comprises determining a histogram weight by using the determined block color evaluation value, and determining the block weight by using the histogram weight and a G level weight.

16. The image processing method of claim 14, wherein the determining of the shading estimation coefficient comprises:
classifying the plurality of blocks into a plurality of groups;
determining the group evaluation value by using the determined block statistics and the classified groups;
determining a valid group by using the determined block statistics and the determined group evaluation value; and
determining the shading estimation coefficient by using the determined valid group.

17. The image processing method of claim 16, wherein the determining of the group evaluation value comprises determining the group evaluation value by averaging average values of the determined block evaluation values for each distance from a center of the captured image.

18. The image processing method of claim 16, wherein the determining of the shading estimation coefficient comprises:
estimating an approximate straight line by using the determined group evaluation value, and determining the shading estimation coefficient by using the estimated approximate straight line; and
estimating a sample variance by using the determined block evaluation value, and determining the shading estimation coefficient by using the estimated sample variance.

19. The image processing method of claim 16, wherein the determining of the shading estimation coefficient comprises:
estimating a variance by using the determined group evaluation value, and determining the shading estimation coefficient by using the estimated variance; and
estimating a sample variance by using the determined block evaluation value, and determining the shading estimation coefficient by using the estimated sample variance.

20. A non-transitory computer-readable recording media storing a program for executing the method of claim 11 on a computer.

* * * * *